US012735324B2

(12) United States Patent
Giddey et al.

(10) Patent No.: US 12,735,324 B2
(45) Date of Patent: Sep. 15, 2026

(54) RUTHENIUM PROMOTER CATALYST COMPOSITIONS

(71) Applicant: COMMONWEALTH SCIENTIFIC AND INDUSTRIAL RESEARCH ORGANISATION, Acton (AU)

(72) Inventors: Sarbjit Singh Giddey, Acton (AU); Danielle Frances Kennedy, Victoria (AU); Aniruddha Pramod Kulkarni, Acton (AU); David Alexander, Acton (AU); Khoa Pham, Acton (AU); Gary Mark Paul, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 1358 days.

(21) Appl. No.: 17/464,947

(22) Filed: Sep. 2, 2021

(65) Prior Publication Data

US 2021/0395101 A1 Dec. 23, 2021

Related U.S. Application Data

(63) Continuation of application No. PCT/AU2020/050206, filed on Mar. 5, 2020.

(51) Int. Cl.

*C01C 1/04* (2006.01)
*B01D 53/22* (2006.01)

(Continued)

(52) U.S. Cl.

CPC .......... *C01C 1/0411* (2013.01); *B01D 53/228* (2013.01); *B01D 69/145* (2013.01);

(Continued)

(58) Field of Classification Search

CPC ............ C01C 1/0411; B01D 71/02231; B01D 71/02232; B01D 71/0221; B01D 53/228;

(Continued)

(56) References Cited

U.S. PATENT DOCUMENTS 4,714,692 A * 12/1987 Abrevaya ................ B01J 35/45
427/217
6,235,677 B1 5/2001 Manzer et al.

(Continued)

FOREIGN PATENT DOCUMENTS

CN 101053835 10/2007
CN 102921413 2/2013

(Continued)

OTHER PUBLICATIONS

Imamura, K. & Kubota, J., Electrochemical Membrane Cell for NH3 Synthesis from N2 and H2O by Electrolysis at 200 to 250° C. Using a Ru Catalyst, Hydrogen Permeable Pd Membrane and Phosphate-Based Electrolyte. Sustainable Energy Fuels. 2018, vol. 2, pp. 1278-1286.

(Continued)

*Primary Examiner* — James A Fiorito
(74) *Attorney, Agent, or Firm* — Bryan Cave Leighton Paisner LLP

(57) ABSTRACT

The present disclosure relates to ruthenium promoter catalyst compositions. The ruthenium promoter catalyst compositions comprise ruthenium metal species, an oxide support material, and a promoter species independently selected from the group consisting of La, Rb, Y, Yb, K, Cs, and Ba, or hydroxides, nitrates or oxides thereof. The present disclosure also relates to various methods, processes, systems, membranes and/or reactors, which can utilise the ruthenium promoter catalyst compositions, for example in ammonia synthesis.

12 Claims, 11 Drawing Sheets

(51) Int. Cl.

| | |
|---|---|
| ***B01D 69/14*** | (2006.01) |
| ***B01D 71/02*** | (2006.01) |
| ***B01J 19/24*** | (2006.01) |
| ***B01J 21/10*** | (2006.01) |
| ***B01J 23/10*** | (2006.01) |
| ***B01J 23/46*** | (2006.01) |
| ***B01J 35/45*** | (2024.01) |
| ***B01J 37/02*** | (2006.01) |

(52) U.S. Cl.
CPC ... *B01D 71/0221* (2022.08); *B01D 71/02231* (2022.08); *B01D 71/02232* (2022.08); *B01J 19/2475* (2013.01); *B01J 21/10* (2013.01); *B01J 23/10* (2013.01); *B01J 23/462* (2013.01); *B01J 35/45* (2024.01); *B01J 37/0215* (2013.01)

(58) Field of Classification Search
CPC ..... B01D 69/145; B01J 35/40; B01J 19/2475; B01J 21/10; B01J 23/10; B01J 23/462; B01J 37/0215
See application file for complete search history.

(56) References Cited

U.S. PATENT DOCUMENTS

| | | | |
|---|---|---|---|
| 2004/0024274 | A1 | 2/2004 | Bottcher et al. |
| 2016/0288114 | A1 | 10/2016 | Way et al. |

FOREIGN PATENT DOCUMENTS

| | | |
|---|---|---|
| CN | 105579399 | 5/2016 |
| CN | 109126787 | 1/2019 |
| GB | 1434176 | 5/1976 |
| WO | 2015/021501 | 2/2015 |
| WO | 2018/104455 | 6/2018 |

OTHER PUBLICATIONS

Itoh, M., et al., High Dependence for Reaction Pressure on Ru/(MgOCeO2)/Ag—Pd Ammonia Synthesis Membrane Reactor. Chem. Lett. 2005, vol. 34, No. 8, pp. 1104-1105.

CN Office Action for Application No. 202080027526.2 dated Jul. 26, 2023.

Imamura, et al. "Ammonia Synthesis from Nitrogen and Water by Electricity Using an Electrochemical Cell with Ru Catalyst, Hydrogen-Permeable Pd—Ag Membrane, and Phosphate Based Electrolyte; Supporting Information," ChemistrySelect, vol. No. 34, Dec. 4, 2017 pp. 1-4.

Extended European Search Report for PCT/AU2020/050206 dated Nov. 8, 2022.

* cited by examiner

C
C
Ce
Ce
Ru
Pd
Ru
K
Ba
Cs
Ba
Ce
Ce
Ce
Ce
Ce
Spectrum 1
Wt% σ
C 378 3.9
Ce 327 2.1
O 185 1.2
Pd 3.6 0.3
Ru 3.2 0.3
Ba 2.4 0.3
Cs 1.6 0.2
K 0.4 0.1

RUTHENIUM PROMOTER CATALYST COMPOSITIONS

CROSS-REFERENCE TO RELATED APPLICATIONS

The present application is a continuation of PCT International Application No. PCT/AU2020/050206, filed on Mar. 5, 2020 which claims benefit to Australian Application No. 2019900709, filed Mar. 5, 2019. The entire contents of the above applications are incorporated by reference as if recited in full herein.

FIELD

The present disclosure relates to ruthenium promoter catalyst compositions. The present disclosure also relates to various methods, processes, systems, membranes and/or reactors, which can utilise the ruthenium promoter catalyst compositions, for example in ammonia synthesis.

BACKGROUND

Ammonia is one of the most produced and consumed chemicals in the world. Over 100 million tons of ammonia is produced per annum with about 2% of the world's energy consumption. Ammonia is used mainly in the fertiliser industry (>80%) and for industrial processes (20%) as a source of nitrogen. Ammonia has application in the production of many other important chemicals, such as polymers, dies and explosives.

Ammonia is produced at present through the Haber-Bosch process, which is an energy intensive process requiring hydrogen and nitrogen to react (i.e. $3H_2+N_2\rightarrow 2NH_3$) on an iron based catalyst (such as iron oxide) at high temperatures (up to 500° C.) and high pressure (up to 300 bar). This reaction is exothermic and has a negative entropy change that requires high temperatures (kinetics) and high pressures for the reaction to proceed at reasonable rates, and there is only 10-15% conversion of reactants at each stage. Consequently, the step is repeated several times. The total energy consumption by this route is very high at 9500 kwh/ton of ammonia produced (12000 kwh/ton if $H_2$ is produced via electrolysis rather than via natural gas reforming).

Other methods of producing ammonia include electrochemical based processes. The electrochemical route for production of ammonia can save more than 20% of the energy consumed as compared to the Haber-Bosch process, although still requires relatively high energy input and also suffers from low conversion rates. Hydrogen can be sourced from natural gas reforming, electrolysis of water, or can be produced in situ by electrolysis of water or decomposition of an organic solvent such as ethanol. The process can be carried out under ambient conditions or at higher temperatures depending on the type of the electrolyte material used.

Iron based catalysts, such as iron oxide, are currently used in the Haber-Bosch process. However, iron based catalysts require severe conditions such as high temperatures (up to 500° C.) and high pressure (up to 300 bar) in order to work. Consequently, there is a need to find alternative catalyst compositions that can be used in processes for the synthesis of ammonia that can reduce the severity of process conditions, lower energy consumption per unit of ammonia produced, and/or enhance ammonia conversion rates.

Other industrially important chemical processes include hydrogen peroxide synthesis from oxygen and hydrogen, and hydrocarbon synthesis from carbon monoxide or carbon dioxide and hydrogen. Such processes either typically involve catalysed reactions operating at high temperatures and pressures, or direct or indirect electrochemical processes that also require a high energy input. Current industrial processes are energy intensive, have low efficiency and energy recycling is poor. Consequently, there is also a need to identify alternative catalyst compositions that can be used in processes for large scale synthesis of products at reduced energy inputs.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

The present applicant has developed various ruthenium promoter catalyst compositions, which are effective for use in ammonia synthesis. The ruthenium promoter catalyst compositions comprise a ruthenium metal species, an oxide support material, and one or more selected catalytic promoter species. The catalytic promoter species can be independently selected from the group consisting of La, Rb, Y, Yb, K, Cs, and Ba, or hydroxides, nitrates or oxides thereof. The present disclosure also relates to various methods, processes, systems, membranes and/or reactors, which can utilise the ruthenium promoter catalyst compositions.

In one aspect, there is provided a catalyst composition comprising a ruthenium metal species, an oxide support material, and one or more catalytic promoter species each independently selected from the group consisting of La, Rb, Y, Yb, K, Cs, and Ba, or hydroxides, nitrates or oxides thereof.

In one embodiment, the catalyst composition further comprises or consists of two or more catalytic promoter species each independently selected from the group consisting of La, Rb, Y, Yb, K, Cs, and Ba, or hydroxides, nitrates or oxides thereof. In another embodiment, the catalyst composition further comprises or consists of three or more catalytic promoter species independently selected from the group consisting of La, Rb, Y, Yb, K, Cs, and Ba, or hydroxides, nitrates or oxides thereof.

In another embodiment, each catalytic promotor species may be independently selected from the group consisting of K, Cs and Ba, or hydroxides, nitrates or oxides thereof.

In another embodiment, the catalyst compositions may further comprise or consist of a transport promoter species, for example palladium metal particles or a precursor thereof.

In another embodiment, the oxide support material is selected from the group consisting of magnesia, ceria, silica, zirconia, titania, and alumina, and any combinations thereof. In another embodiment, the oxide support material is selected from one of magnesia, ceria, silica, zirconia, titania, or alumina. In another embodiment, the oxide support material is magnesia or ceria. In another embodiment, the oxide support material is ceria. In another embodiment, the oxide support material comprises the ruthenium metal species. The oxide support material or ruthenium metal species may comprise the catalytic promotor species. The oxide support material and/or catalyst composition may comprise a transport promoter species. In another embodiment, the oxide support material is in the form of a plurality of particles. Each of the oxide support particles may further comprise or consist of the ruthenium metal species, one or more catalytic promoter species, and optionally the transport promoter species. The ruthenium metal species, one or more catalytic promoter species, and optionally the transport promoter species, may be present as particles on the oxide support particles. These particles have also been referred to as "hybrid particles" and are described in various further embodiments and examples below.

In some embodiments, the catalyst composition may comprise one or more catalyst hybrid particles. Each catalyst hybrid particle may comprise an oxide support particle comprising one or more ruthenium metal particles and one or more catalytic promoter species, for example two or more or three or more catalytic promoter species. In some embodiments, each catalyst hybrid particle may comprise a ceria support particle comprising one or more ruthenium metal particles and one or more catalytic promoter species independently selected from the group consisting of K, Cs, and Ba, or hydroxides, nitrates or oxides thereof. In some embodiments, each catalyst hybrid particle may comprise a ceria support particle comprising one or more ruthenium metal particles and two or more catalytic promoter species independently selected from the group consisting of K, Cs, and Ba, or hydroxides, nitrates or oxides thereof. In some embodiments, each catalyst hybrid particle may comprise a ceria support particle comprising one or more ruthenium metal particles and three or more catalytic promoter species independently selected from the group consisting of K, Cs, and Ba, or hydroxides, nitrates or oxides thereof.

In another embodiment, the catalytic promoter species are in contact and/or close proximity with the ruthenium metal particles.

The oxide support material may have an average particle size of from about 5 nm to about 10 μm, for example from about 5 nm to about 100 nm or 10 nm to about 50 nm.

In another embodiment, the ruthenium metal species is provided on the oxide support material in an amount of between about 1 to 15 wt % compared to the weight of oxide support material, for example between about 5 to 10 wt % compared to the weight of oxide support material.

In another embodiment, the molar ratio of the promoter species to the ruthenium metal species is between about 1:10 to 10:1, for example between about 1:10 to about 1:1 or between about 1:2 to about 2:3.

In another embodiment, the ruthenium metal species is in the form of ruthenium metal nanoparticles. The ruthenium metal nanoparticles may have an average particle size of from about 1 nm to about 30 nm.

In another embodiment, the catalyst composition further comprises or consists of a transport promoter species. The transport promoter species may comprise a metal species selected from the group consisting of molybdenum, tungsten, iron, cobalt, boron, chromium, tantalum, osmium, palladium, platinum, nickel, and combinations thereof. In another embodiment, the transport promoter species is a palladium metal species. The transport promoter species may be a metal precursor species, for example palladium oxide. The transport promoter species may be present as discrete particles in the catalyst composition and/or present on the oxide support material (e.g. oxide support particles). The transport promoter species may be provided in the form of a plurality of particles.

In another aspect, there is provided a use of a catalyst composition according to any embodiments or examples thereof as described herein for catalysing the synthesis of ammonia.

In another aspect, there is provided a method for the synthesis of ammonia comprising use of a catalyst composition according to any embodiments or examples thereof as described herein.

In another aspect, there is provided a nitrogen species selectively permeable solid membrane (NSPM) formed from a nitrogen permeable material, wherein the membrane comprises a coating on at least one side thereof comprising a catalyst composition according to any embodiments or examples thereof as described herein.

In another aspect, there is provided a hydrogen species selectively permeable solid membrane (HSPM) formed from a hydrogen permeable material, wherein the membrane comprises a coating on at least one side thereof comprising a catalyst composition according to any embodiments or examples thereof as described herein.

In another aspect, there is provided a use of the NSPM or HSPM membrane comprising the catalyst composition according to any embodiments or examples thereof as described herein in the synthesis of ammonia.

In another aspect, there is provided a method of synthesis of ammonia comprising the NSPM or HSPM membrane according to any embodiments or examples thereof as described herein.

In another aspect, there is provided a reactor for synthesis of a product by reaction of at least a first reactant with a second reactant, the reactor comprising:

- a first chamber section and a second chamber section separated by a nitrogen or hydrogen species selectively permeable solid membrane (NSPM or HSPM) according to any embodiments or examples thereof as described herein, and configured to provide a nitrogen or hydrogen species receiving side of the membrane in the first chamber section and a product synthesis side of the membrane in the second chamber section;
- a first reactant inlet for supply of a first reactant source of a hydrogen species to the first chamber section;
- a second reactant inlet for supply of a second reactant source to the second chamber section; and
- a first outlet for obtaining at least a product of the reaction.

In another aspect, there is provided a system for synthesis of a product by reaction of at least a first reactant comprising a nitrogen or hydrogen species with a second reactant, the system comprising:

- a reactor according to any embodiments or examples thereof as described herein; and
- a control means to control the concentration or partial pressure of nitrogen or hydrogen to be lower on the product synthesis side than on the nitrogen or hydrogen species receiving side, to thereby effect migration of the nitrogen or hydrogen species through the membrane to the product synthesis side for reaction with the second reactant to form the product.

In another aspect, there is provided a process for synthesis of a product by reaction of at least a first reactant comprising a nitrogen or hydrogen species with a second reactant, the process comprising:

(i) providing a nitrogen or hydrogen species selectively permeable solid membrane (NSPM or HSPM) according to any embodiments or examples thereof as described herein, having a nitrogen or hydrogen species receiving side, respectively, and a product synthesis side;

(ii) providing a nitrogen or hydrogen species source at the nitrogen or hydrogen species receiving side, respectively;

(iii) providing a second reactant source at the product synthesis side;

(iv) providing a concentration gradient or a partial pressure differential of the nitrogen or hydrogen species source across the NSPM or HSPM, respectively, such that the concentration of nitrogen or hydrogen is lower on the product synthesis side than on the nitrogen or hydrogen species receiving side to thereby effect migration of the nitrogen or hydrogen species through the NSPM or HSPM, respectively, for reaction as the first reactant with the second reactant at or near the surface of the product synthesis side.

In another aspect, there is provided a process for preparing a ruthenium promoter catalyst, the process comprising the steps of:

i) providing a polar solvent system comprising a ruthenium supported on particulate material and one or more catalytic promoter species independently selected from the group consisting of La, Rb, Y, Yb, K, Cs, and Ba, or hydroxides, nitrates or oxides thereof; and ii) removing the polar solvent system to obtain the ruthenium promoter catalyst.

In another aspect, there is provided a ruthenium promoter catalyst prepared by the process according to any embodiment or example thereof as described herein.

It will be appreciated that any one or more of the embodiments and examples as described above for the catalyst composition may also apply to the membrane, reactor, system, process, use, or method, as described herein. Any embodiment herein shall be taken to apply mutatis mutandis to any other embodiment unless specifically stated otherwise.

The present invention is not to be limited in scope by the specific embodiments described herein, which are intended for the purpose of exemplification only. Functionally-equivalent products, compositions and methods are clearly within the scope of the invention, as described herein.

It will be appreciated that some features of the ruthenium catalyst compositions, methods, processes, membranes, reactors or systems thereof identified in some aspects, embodiments or examples as described herein may not be required in all aspects, embodiments or examples as described herein, and this specification is to be read in this context. It will also be appreciated that in the various aspects, embodiments or examples, the order of method or process steps may not be essential and may be varied.

BRIEF DESCRIPTION OF THE DRAWINGS

Particular embodiments of the present disclosure will now be further described and illustrated, by way of example only, with reference to the accompanying drawings in which.

DETAILED DESCRIPTION

Figure 1A:
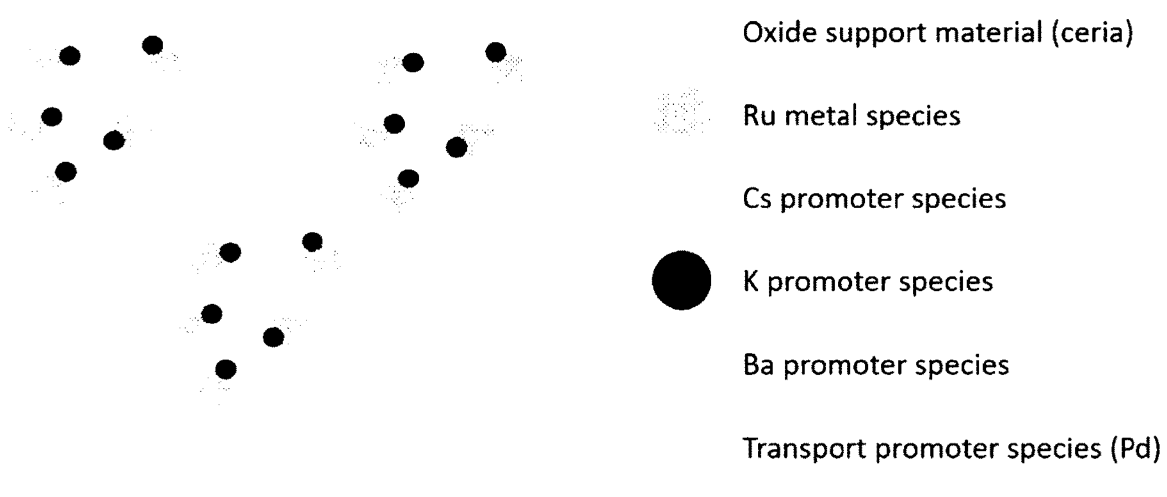
FIG. 1*a* provides a schematic representation of the catalyst compositions according to one embodiment of the present disclosure where the catalyst compositions comprise an oxide support material (ceria), Ru metal species, Cs, K and Ba promoter species, and a transport promoter species (Pd).

The present disclosure is described in the following various non-limiting embodiments, which relate to investigations undertaken to identify alternative catalyst compositions. Additional non-limiting embodiments of the catalyst compositions, membranes, reactors, systems, and processes comprising the alternative catalyst compositions are also described. It has been surprisingly found that a catalyst composition comprising a ruthenium metal species and promoter species as described herein provides one or more advantages for the synthesis of products, such as ammonia from a hydrogen and nitrogen source.

Furthermore, improved processes for synthesising products using selectively permeable solid membranes comprising the ruthenium catalyst compositions have also been developed. It has been surprisingly found that applying a pressure differential across a nitrogen or hydrogen species selectively permeable membrane (NSPM or HSPM) that is surface modified with the catalyst compositions on the product synthesis side as described herein provides advantages for the synthesis of products, for example synthesis of ammonia from a hydrogen and nitrogen source. The process may also be effective at lower pressures and without application of any electrical energy. Processes as described herein according to at least some embodiments can therefore provide a lower energy alternative for production or synthesis of industrial chemicals, which are currently produced by relatively high energy processes using high temperatures and pressures.

With reference to ammonia production, one or more of the following advantages may be provided by the catalyst compositions according to at least some of the embodiments or examples as described herein:

- increased efficiency with respect to energy input and higher conversion rates at less severe process conditions;
- hydrogen can be sourced from natural gas reforming, coal gasification, biomass or by water electrolysis;
- hydrogen feedstock containing gases such as $CO_2$ may be used for ammonia synthesis without the need for further gas cleaning;
- flexibility can be achieved in controlling hydrogen flux through the membrane (temperature, membrane type and thickness, and differential pressure across the membrane) to enable enhanced hydrogen conversion rates;
- pressure driven and low differential pressure operation provides a relatively low energy alternative to current energy intensive processes;
- hydrogen feedstock costs can be significantly reduced by integrating a water-gas-shift reaction ($H_2O+CO=H_2+CO_2$), hydrogen/$CO_2$ gas separation processes in the membrane reactor according to the process, as opposed to sourcing hydrogen from a natural gas reformer or water electrolyser.

Terms

The term "HSPM" as used herein refers to a hydrogen species selectively permeable solid membrane that can permit the migration of a hydrogen species through the membrane.

The term "NSPM" as used herein refers to a nitrogen species selectively permeable solid membrane that can permit the migration of a nitrogen species through the membrane.

The term "mobile hydrogen species" as used herein refers to one or more species of hydrogen that are capable of selective migration through the HSPM membrane, such as atomic hydrogen, which includes a positive or negatively charged (hydride) species of hydrogen. It will be appreciated that the "mobile hydrogen species" will depend on the selected membrane and type of process being undertaken.

The term "mobile nitrogen species" as used herein refers to one or more species of nitrogen that are capable of selective migration through the NSPM membrane, such as atomic nitrogen, which includes a positive or negatively charged (nitride) species of nitrogen. It will be appreciated that the "mobile nitrogen species" will depend on the selected membrane and type of process being undertaken.

The term "surface modification", "surface modified" or like term, in relation to the membrane refers to a modification or treatment of at least part of the surface to provide a layer that is porous to the reactant species and contains a plurality of reactive sites comprising a ruthenium metal species for promoting a reaction within the layer between the reactant species. The "surface modification" is such as to produce a three-dimensional layer on the surface comprising a substantial surface area therein that is available for a catalysed reaction between first and second reactants. The term "reaction sites" refers to a plurality of sites within the layer wherein each site comprises a metal species capable of providing, conducting or transporting a first reactant of a mobile hydrogen species or mobile nitrogen species, and further comprises at least a ruthenium metal species for promoting a reaction within the layer between the first and second reactants.

The term "roughened surface" or "roughened surface layer" as used herein may be defined as microscopic changes in the slope of the surface. The "roughened surface" or "roughened surface layer" is such that the surface may include raised or lowered elements and spaces there between which act to substantially enhance the surface area of the surface.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Catalyst Compositions

The present disclosure relates to ruthenium based catalyst compositions. The ruthenium based catalyst compositions may be used in various methods, processes, permeable membranes, reactors and systems, for the synthesis of products, such as ammonia synthesis. The catalyst composition comprises a ruthenium metal species, a selection of catalytic promoter species and a support material.

In one embodiment, there is provided a catalyst composition comprising or consisting of a ruthenium metal species, one or more catalytic promoter species and an oxide support material, wherein each catalytic promoter species is independently selected from the group consisting of La, Rb, Y, Yb, K, Cs, and Ba, or hydroxides, nitrates or oxides thereof. In another embodiment, there is provided a catalyst composition comprising or consisting of a ruthenium metal species, two or more three catalytic promoter species and an oxide support material, wherein each catalytic promoter species is independently selected from the group consisting of La, Rb, Y, Yb, K, Cs, and Ba, or hydroxides, nitrates or oxides thereof. In another embodiment, there is provided a catalyst composition comprising or consisting of a ruthenium metal species, three or more catalytic promoter species and an oxide support material, wherein each catalytic promoter species is independently selected from the group consisting of La, Rb, Y, Yb, K, Cs, and Ba, or hydroxides, nitrates or oxides thereof.

In another embodiment, there is provided a catalyst composition comprising or consisting of a ruthenium metal species, one or more catalytic promoter species, an oxide support material, a transport promoter species, and optionally an additive, wherein each catalytic promoter species is independently selected from the group consisting of La, Rb, Y, Yb, K, Cs, and Ba, or hydroxides, nitrates or oxides thereof. In another embodiment, there is provided a catalyst composition comprising or consisting of a ruthenium metal species, two or more catalytic promoter species, an oxide support material, a transport promoter species, and optionally an additive, wherein each catalytic promoter species is independently selected from the group consisting of La, Rb, Y, Yb, K, Cs, and Ba, or hydroxides, nitrates or oxides thereof. In another embodiment, there is provided a catalyst composition comprising or consisting of a ruthenium metal species, three or more catalytic promoter species, an oxide support material, a transport promoter species, and optionally an additive, wherein each catalytic promoter species is independently selected from the group consisting of La, Rb, Y, Yb, K, Cs, and Ba, or hydroxides, nitrates or oxides thereof.

Further details and embodiments of the catalyst composition are described as follows:

Ruthenium Metal Species

As described herein, the catalyst compositions comprise a ruthenium metal species. The ruthenium metal species can act as a catalyst, for example can facilitate hydrogen insertion or the dissociation of a reactant, such as molecular nitrogen to atomic nitrogen, and to assist in the formation of a product, such as ammonia.

The ruthenium metal species may be produced via the decomposition of one or more ruthenium based precursors (also referred to as "ruthenium precursors"). For example, the ruthenium metal species may be produced by using one or more compounds such as inorganic metal compounds and organic metal complexes, which may be susceptible to thermal decomposition, including, e.g., triruthenium dodecacarbonyl [$Ru_3(CO)_{12}$], dichlorotetrakis(triphenylphosphine)ruthenium(II) [$RuCl_2(PPh_3)_4$], dichlorotris(triphenylphosphine)ruthenium(II) [$RuCl_2(PPh_3)_3$], tris (acetylacetonato)ruthenium(III) [Ru(acac)$_3$], ruthenocene [$Ru(C_5H_5)$], and ruthenium chloride [$RuCl_3$]. In one example, the ruthenium metal species is produced via the decomposition of, for example, $RuCl_3$ or $Ru_3(CO)_{12}$.

Alternatively, the ruthenium metal species may be an inorganic metal compound or inorganic metal complex comprising ruthenium. For example, the ruthenium metal species may be selected from the group consisting of triruthenium dodecacarbonyl [$Ru_3(CO)_{12}$], dichlorotetrakis(triphenylphosphine) ruthenium(II) [$RuCl_2(PPh_3)_4$], dichlorotris(triphenylphosphine)ruthenium(II) [$RuCl_2(PPh_3)_3$], tris (acetylacetonato)ruthenium(III) [Ru(acac)$_3$], ruthenocene [$Ru(C_5H_5)$], and ruthenium chloride [$RuCl_3$]. In one embodiment, the ruthenium metal species is $RuCl_3$ or $Ru_3(CO)_{12}$. Catalyst compositions comprising ruthenium metal species prepared via the decomposition of $Ru_3(CO)_{12}$, have been shown according to at least some embodiments to provide good catalytic properties at lower temperatures (400° C.). Catalyst compositions comprising ruthenium metal species prepared via the decomposition of $RuCl_3$ have been shown according to at least some embodiments to provide good catalytic properties at higher temperatures. $RuCl_3$ and $Ru_3(CO)_{12}$ as a ruthenium metal species or precursor source can be used to prepare ruthenium catalyst compositions with overall good catalytic properties compared with other conventional catalyst compositions.

The ruthenium metal species may be in the form of ruthenium metal nanoparticles. The ruthenium metal nanoparticles may be formed via the decomposition of a ruthenium metal precursor compound, for example via the decomposition of one or more of the above ruthenium metal precursor compounds. However, it will be appreciated that other ruthenium metal precursor compounds may also be suitable to form the ruthenium metal nanoparticles.

The ruthenium metal nanoparticles may be formed ex-situ or in-situ. For example, the catalyst composition may comprise an inorganic metal compound or inorganic metal complex comprising ruthenium, where during preparation and/or use of the catalyst composition, the inorganic metal compound or inorganic metal complex comprising ruthenium is decomposed in-situ to form a catalyst composition comprising ruthenium metal nanoparticles.

The ruthenium metal nanoparticles may have an average particle size from about 0.5 nm to about 100 nm. In one embodiment, the ruthenium metal nanoparticles may have an average particle size selected from about 1 nm to about 30 nm or about 1 nm to about 10 nm. In some embodiments, the ruthenium metal nanoparticles may have an average particle size of at least about 1 nm, 2 nm, 3 nm, 4 nm, 5 nm, 6 nm, 7 nm, 8 nm, 9 nm, 10 nm, 15 nm, or 20 nm. In some embodiments, the ruthenium metal nanoparticles may have an average particle size of less than about 50 nm, 40 nm, 30 nm, 20 nm, 15 nm, 10 nm, 9 nm, 8 nm, 7 nm, 6 nm, 5 nm, 5 nm, 3 nm, 2 nm or 1 nm. The ruthenium metal nanoparticles may have an average particle size range selected from any two of the above upper and/or lower values.

The ruthenium metal species may be provided in the catalyst composition in an amount of from about 1 wt % to about 20 wt % of the total mass of the catalyst composition. In some embodiments, the ruthenium metal species may be provided in the catalyst composition in an amount of from about 2 wt % to about 10 wt %, for example of from about 5 wt % to about 10 wt % of the total mass of the catalyst composition. In some embodiments, the ruthenium metal species may be provided in the catalyst composition in an amount of less than about 10 wt % of the total mass of the catalyst composition. In some examples, the ruthenium metal species is provided in the catalyst composition in an amount (wt % of the total mass of the catalyst composition) of at least about 1, 2, 3, 4, 5, 6, 7, 8, 9, 10, 11, 12, 13, 14, 15, 16, 17, 18, 19 or 20. In some examples, the ruthenium metal species is provided in the catalyst composition in an amount (wt % of the total mass of the catalyst composition) of less than about 20, 19, 18, 17, 16, 15, 14, 13, 12, 11, 10, 9, 8, 7, 6, 5, 4, 3, 2, or 1. The ruthenium metal species may be provided in the catalyst composition in a range (wt % of the total mass of the catalyst composition) provided by any two or more of these upper and/or lower amounts, for example in a range of between about 2 to 15 wt %.

Catalytic Promoter Species

The catalyst composition as defined herein may further comprise one or more catalytic promoter species, for example two or more or three or more catalytic promoter species. The catalytic promoter species is a species that may not be a catalyst themselves, but when included in the catalyst composition increases the efficiency of the ruthenium metal species. For ammonia synthesis, it has been found that the catalytic promoter species can assist in dissociation of nitrogen and electron donation, and therefore enhances the catalytic efficiency of the ruthenium metal species, leading to enhanced ammonia synthesis rates.

For example, a catalytic promoter species can act as an electronic promoter which assists in the transfer of electrons to the active ruthenium metal surface, which lowers the $N_2$ dissociating barrier which results in increased catalytic efficiency. The catalytic promoter species may also act as a structural promoter and modifies the local arrangement of the surface ruthenium atoms on the ruthenium metal thus creating highly active sites for catalysis (also known as $B_5$ sites).

The catalyst composition may comprise one or more catalytic promoter species. In one embodiment, the catalyst composition comprises two or more catalytic promoter species. In one particular embodiment, the catalyst composition comprises three catalytic promoter species. For example, the catalyst composition may comprise or consist of a ruthenium metal species and three catalytic promoter species. In some embodiments, it has been found that the presence of three catalytic promoter species (triply promoted) in the ruthenium catalyst compositions can provide excellent catalytic turnover frequency of ammonia synthesis.

The catalytic promoter species may comprise an alkali metal, alkali earth metal or rare-earth metal (e.g. lanthanides), or a combination thereof. In some embodiments, each of the one or more (e.g. two or more/three or more) catalytic promoter species may independently be selected from the group consisting of La, Li, Na, Ce, Ca, Sm, Ag, Mg, Rb, Y, Yb, K, Cs, and Ba. In some embodiments, each of the one or more catalytic promoter species may independently be selected from the group consisting of La, Rb, Y, Yb, K, Cs, and Ba. In one embodiment, each of the one or more catalytic promoter species may independently be selected from the group consisting of K, Cs, and Ba. In another embodiment, the catalytic promoter species can comprise or consist of one or more metal species selected from the group consisting of K, Cs, and Ba. In one embodiment, the catalyst composition comprises or consists of two or more catalytic promoter species selected from a K metal species, Cs metal species and Ba metal species. In one particular embodiment, the catalyst composition comprises or consists of three catalytic promoter species. In one embodiment, the catalyst composition comprises or consists of three catalytic promoter species, wherein the catalytic promoters are independently a K metal species, Cs metal species and Ba metal species.

It will be appreciated that the catalytic promoter species may comprise additional elements or may be present in elemental form. For example, in some embodiments, the catalytic promoter species may comprise a metal species which is in elemental form (i.e. $Cs^0$, $Ba^0$ and $K^0$). In other embodiments, the catalytic promoter species may comprise a metal species in the form of an inorganic compound, for example as an oxide, hydroxide, or nitrate (i.e. CsOH, $Ba(NO_3)_2$ or BaO). In some embodiments, the catalytic promoter species may comprise two or more metal species, wherein at least one metal species may be in elemental form and at least one metal species is in the form of an inorganic compound, such as an oxide, hydroxide, or nitrate. For example, if the catalytic promoter species comprises a barium metal species, the barium metal species may exist in the catalyst composition as both elemental barium ($Ba^0$) and barium oxide (BaO). For example, the elemental $Ba^0$ may influence the electronic properties of the ruthenium metal species (electronic promotion), and the BaO may influence the structure of the ruthenium metal species surface (structural promotion).

The molar ratio of the catalytic promoter species to the ruthenium metal species may be between about 1:10 and 10:1, for example about 1:10 to about 1:1 or 1:5 to 2:1. In one example, the molar ratio of the catalytic promoter species to the ruthenium metal species may be between about 1:2 to about 2:3.

The total molar ratio of promoter to ruthenium metal species may be between about 0.01 and 5, for example between about 0.1 to about 2. The total molar ratio of promoter to ruthenium metal species may be less than about 2, 1.5, 1, 0.9, 0.8, 0.7, 0.6, 0.5, 0.4, 0.3, 0.2 or 0.1. The total molar ratio of promoter to ruthenium metal species may be more than about 0.1, 0.2, 0.3, 0.4, 0.5, 0.6, 0.7, 0.8, 0.9, or 1. The total molar ratio of promoter to ruthenium metal species may be about 1, 0.9, 0.8, 0.6, 0.7, 0.6, 0.5, 0.4, 0.3, 0.2 or 0.1. The catalytic promoter species may have a total molar ratio of promoter to ruthenium metal species provided in a range between any two of these previous upper and/or lower values.

In some embodiments, where the catalyst composition comprises two or more catalytic promoter species, each promoter species may be provided in an equivalent amount or as roughly an equal mix. For example, where the catalyst composition comprises two catalytic promoter species, the two catalytic promoter species may each be provided as a ratio of total promoter species of about 0.5 (i.e. about 1:1). In another example, where the catalyst composition comprises three catalytic promoter species, the three catalytic promoter species may each be provided as a ratio of total promoter species of about 0.333 (i.e. about 1:1:1). The molar amount of any individual catalytic promoter species per 1 mole of a total amount of combined catalytic promoter species (e.g. two or more, or three or more, catalytic promoter species) may be at least 0.1, 0.2, 0.3, 0.4, 0.5, 0.6, 0.7, 0.8, or 0.9. The molar amount of any individual catalytic promoter species per 1 mole of a total amount of combined catalytic promoter species (e.g. two or more, or three or more, catalytic promoter species) may be less than about 0.9, 0.8, 0.7, 0.6, 0.5, 0.4, 0.3, 0.2, or 0.1. The molar amount of any individual catalytic promoter species per 1 mole of a total amount of combined catalytic promoter species (e.g. two or more, or three or more, catalytic promoter species) may be in a range provided by any two of these upper and/or lower values.

In some embodiments, the catalytic promoter species is in close proximity to the ruthenium metal species. For example, the catalytic promoter species may be provided on the surface of the ruthenium metal species or in close association thereof. For example, FIG. 1*a* provides an embodiment of a catalyst composition wherein the catalytic promoter species (i.e. Cs, K and Ba) is provided on the surface of the ruthenium metal species.

In some examples, the total amount of catalytic promoter species in the catalyst composition is provided in an amount (wt % of the total mass of the catalyst composition) of at least about 1, 2, 3, 4, 5, 6, 7, 8, 9, 10, 11, 12, 13, 14, 15, 16, 17, 18, 19 or 20. In some examples, the total amount of catalytic promoter species in the catalyst composition is provided in an amount (wt % of the total mass of the catalyst composition) of less than about 20, 19, 18, 17, 16, 15, 14, 13, 12, 11, 10, 9, 8, 7, 6, 5, 4, 3, 2, or 1. The total amount of catalytic promoter species may be provided in the catalyst composition in a range (wt % of the total mass of the catalyst composition) provided by any two or more of these upper and/or lower amounts, for example in a range of between about 1 to 10 wt % or 2 to 15 wt %.

Support Material

The catalyst composition as described herein may also comprise a support material. The support material may allow use of a reduced amount of catalytic metal species (i.e.

ruthenium metal species) by providing a high surface area which provides for higher catalytic metal species dispersion and therefore a reduced amount of catalytic metal species. Various advantages can be provided by the support material such as reduced costs and increased catalytic efficiency.

In one embodiment, the catalyst composition comprises an oxide support material. The oxide support material may be a metal oxide. Alternatively, the oxide support material may be a metalloid oxide (e.g. silica, silicate). The oxide support material may be a mixture of a metal oxide and a metalloid oxide (e.g. a zeolite). The oxide support material may be selected from the group consisting of an alkali earth metal oxide (e.g. magnesia), a transition metal oxide (e.g. titania), a rare earth (e.g. lanthanide) metal oxide (e.g. ceria, thoria), or a post-transition metal oxide (e.g. alumina).

In some embodiments, the oxide support material may be selected from the group consisting of magnesia, ceria, silica, zirconia, titania, alumina, and any combinations thereof. In some embodiments, the oxide support material is selected from one of magnesia, ceria, silica, zirconia, titania, or alumina. In one embodiment, the oxide support material may be ceria ($CeO_2$) or magnesia (MgO). In one particular embodiment, the oxide support material is ceria. Further advantages may be provided by ammonia catalyst compositions according to some embodiments of the present disclosure, wherein a ceria support may provide increased synthesis rates and % $H_2$ conversion rate when used in ammonia synthesis (see FIG. 6). Other further advantages may be provided using ceria as a support, such as increased catalyst stability as a result of reduced methanation during ammonia synthesis. The ceria may be in the form of bulk ceria, mesoporous ceria or nano-sized ceria.

In some embodiments, the support material (e.g. oxide support material such as ceria or magnesia) is in the form of a plurality of particles. The support material as described herein in further embodiments and examples may also be referred to as a "particulate material" when provided in the form of particles. In some embodiments, the oxide support material (e.g. ceria or magnesia) is in the form of a plurality of particles. The particles may have an average particle size in the range of from about 5 nm to about 10 μm, for example of from about 10 nm to about 50 nm. The oxide support material may have an average particles size greater than about 5 nm, 10 nm, 15 nm, 20 nm, 50 nm, 100 nm, 250 nm, 500 nm, 1 μm, 2 μm, 3 μm or 5 μm. The oxide support material may have an average particle size less than about 10 μm, 5 μm, 1 μm, 500 nm, 250 nm, 100 nm, 50 nm, 20 nm, 15 nm, or 15 nm. The oxide support material may have an average particle size provided in a range between any two of these previous upper and/or lower values. In one example, the oxide support material may have an average particle size of less than about 10 μm, such as about 5 μm, or less than about 1 μm. In other examples, the oxide support material may have an average particle size of less than about 100 nm, 90 nm, 80 nm, 70 nm, 60 nm, 50 nm, 40 nm, 30 nm, 20 nm, or 15 nm.

In some embodiments, the oxide support material is ceria. The ceria may be in the form of a plurality of particles. For example, the ceria may be bulk, mesoporous or nanosized ceria. The ceria particles may have an average particle size according to any one of the examples as described in the previous paragraph.

The oxide support material is porous. The oxide support material may comprise one or more pores having a pore diameter of less than about 2 nm (i.e. microporous), from about 2 nm to about 50 nm (i.e. mesoporous) and from greater than about 50 nm (i.e. macroporous). In some embodiments, the oxide support material may be microporous ceria, mesoporous ceria or macroporous ceria.

The surface area of the support may be 20 to 100 $m^2/g$, typically 30 to 50 $m^2/g$.

In some embodiments, the support material comprises the ruthenium metal species. For example, the ruthenium metal species may be provided on the oxide support material. It will be appreciated that where a ruthenium metal species is in contact with a surface of the oxide support material, for the purposes of this disclosure, the ruthenium metal species will be considered to be provided on the oxide support material. By way of example, the ruthenium metal species may be provided on an external surface of the oxide support material (e.g. an outer surface) or provided on an internal surface of the oxide support material (e.g. on a surface within a pore of the oxide support material). As such, it will be appreciated that the ruthenium metal species is not limited to any particular location on the oxide support material. For example, FIG. 1*a* shows one example of a catalyst composition wherein the ruthenium metal species is provided on the oxide support material.

In one embodiment, the ruthenium metal species may be provided on the oxide support material in an amount according to any embodiment or example thereof as described herein for the ruthenium metal species in the catalyst composition. For example, the ruthenium metal species may be provided in an amount of between about 1 to 15 wt % compared to the weight of the oxide support material, for example between about 5 to 10 wt compared to the weight of the oxide support material.

In some examples, the total amount of support material (e.g. oxide support particles) in the catalyst composition is provided in an amount (wt % of the total mass of the catalyst composition) of at least about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, or 85. In some examples, the total amount of support material (e.g. oxide support particles) in the catalyst composition is provided in an amount (wt % of the total mass of the catalyst composition) of less than about 90, 85, 80, 75, 70, 65, 60, 55, 50, 45, 40, 35, 30, 25, 20, 19, 18, 17, 16, 15, 14, 13, 12, 11, 10, 9, 8, 7, 6, 5, 4, 3, 2, or 1. The total amount of support material (e.g. oxide support particles) may be provided in the catalyst composition in a range (wt % of the total mass of the catalyst composition) provided by any two or more of these upper and/or lower amounts, for example in a range of between about 10 to 50 wt % or 20 to 80 wt %.

In some embodiments, the support material may comprise one or more catalytic promoter species. In some embodiments, the oxide support material may comprise one or more catalytic promoter species. The oxide support material may comprise two or more catalytic promoter species. For example, the catalytic promoter species may be provided on the oxide support material. It will be appreciated that where the catalytic promoter species is in contact with a surface of the oxide support material, for the purposes of this disclosure, the catalytic promoter species is provided on the oxide support material. By way of example, the catalytic promoter species may be provided on an external surface of the oxide support material (e.g. an outer surface) or provided on an internal surface of the oxide support material (e.g. on a surface within a pore of the oxide support material). As such, it will be appreciated that the catalytic promoter species may not be limited to a particular location on the oxide support material. For example, FIG. 1*a* shows a catalyst composition wherein the catalytic promoter species is provided on the oxide support material.

In some embodiments, the oxide support material may comprise or consist of a ruthenium metal species and one or more catalytic promoter species. In some embodiments, the support material may comprise or consist of a ruthenium metal species and two or more catalytic promoter species. In some embodiments, the support material may comprise or consist of a ruthenium metal species and at least three catalytic promoter species.

In some embodiments, the oxide support material or ruthenium metal species may comprise one or more catalytic promoter species. In one embodiment, the oxide support material and ruthenium metal species may each comprise one or more catalytic promoter species. For example, the oxide support material may comprise one or more catalytic promoter species, and the ruthenium metal species may comprise one or more catalytic promoter species, wherein the catalytic promoter species on each of the oxide support material and the ruthenium metal species can be the same or different species. For example, FIG. 1*a* shows a catalyst composition wherein the ruthenium metal species is provided on the oxide support material and the catalytic promoter species are provided on both the oxide support material and the ruthenium metal species.

Figure 1B:
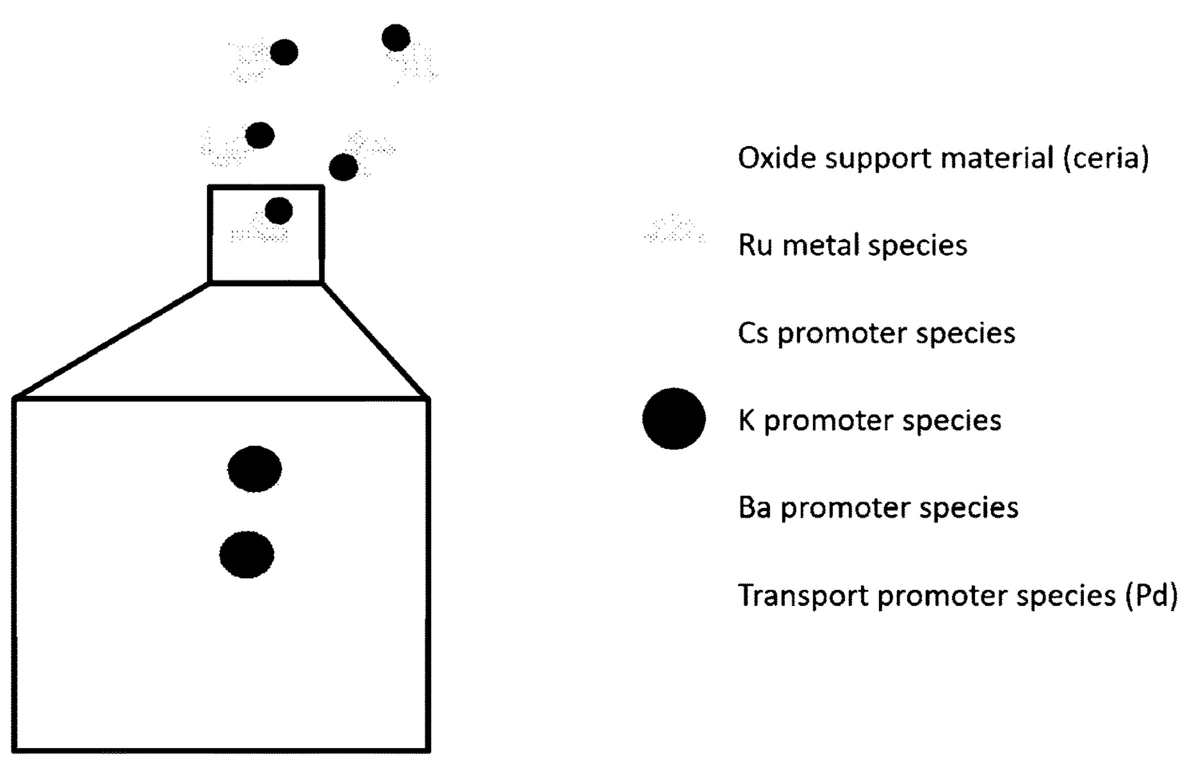
FIG. 1*b* provides a schematic representation of the surface of the oxide support material according to one embodiment of the present disclosure where the ruthenium metal species is located on the surface of the oxide support material, and the catalytic promoter species is located on the surface of the oxide support material at the interface with the ruthenium metal species and/or on the surface of the ruthenium metal species.
Figure 1C:
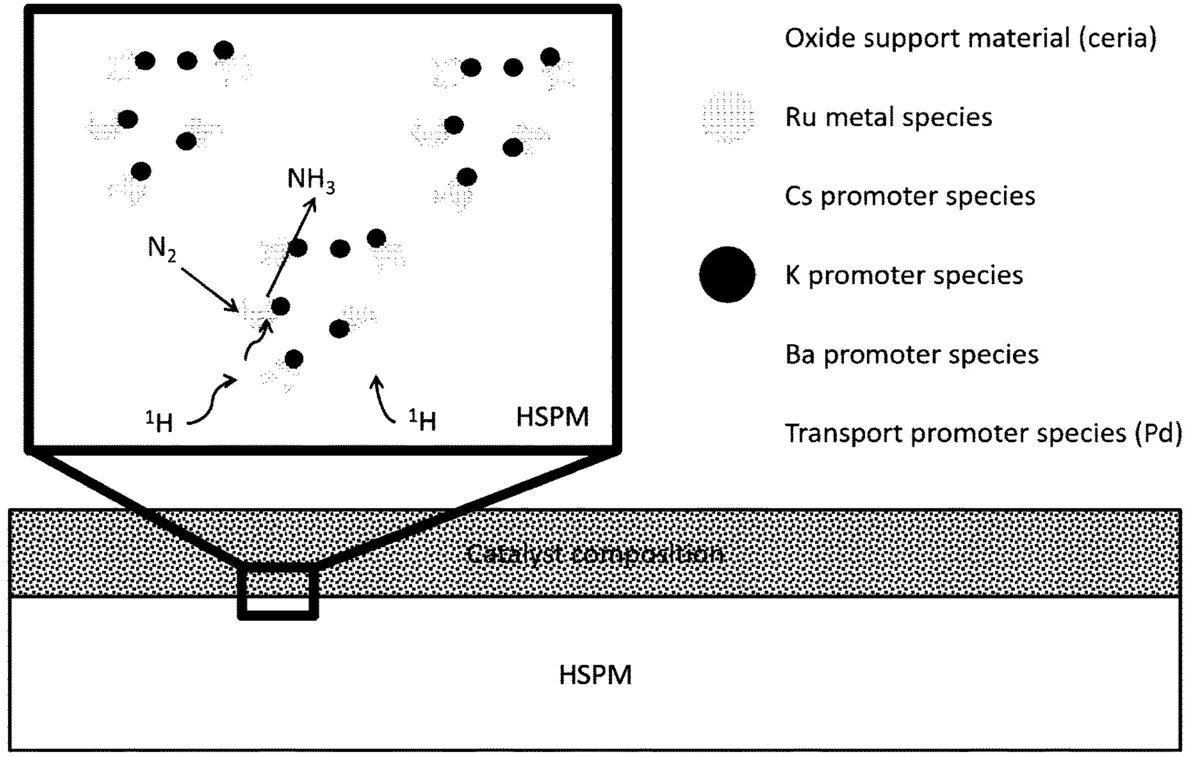
FIG. 1*c* provides a schematic representation of the triply promoted ruthenium catalyst supported on particulate oxide support according to one embodiment of the present disclosure as shown in FIGS. 1*a* and 1*b*, which is located at a hydrogen species permeable membrane surface.

In one embodiment, the catalytic promoter species is located in close proximity to the ruthenium metal species. For example, as seen in FIGS. 1*a-c*, in some embodiments the catalytic promoter species may be localized on the surface of the oxide support material e.g. a Cs promoter on a ceria support particle), such as at the interface between the surface of the ruthenium metal species and the oxide support material. In this embodiment, it is believed that the promotion effect from the catalytic promoter (e.g. Cs) occurs at the contact points between Ru and the catalytic promoter located on the surface of the oxide support material, and may form a ring around the base of the Ru on the oxide support surface in some examples (i.e. "hot ring"/electronic promotion). In other embodiments, the catalytic promoter species may be located on the surface of the ruthenium metal species, where it can influence the structure of the ruthenium surface (i.e. structural promotion), by modifying the local arrangement of the surface the ruthenium atoms on the ruthenium metal create highly active sites for catalysis. Certain further advantages may be provided by having the catalytic promoter species in close proximity to the ruthenium metal species (e.g. at the interface between the oxide support material surface and the ruthenium metal species and/or on the ruthenium metal species only) such as increased catalytic efficiency and/or stability.

In other embodiments, the catalytic promoter species is located within 10 nm of the ruthenium metal species. For example, the catalytic promoter species may be located at a distance from the ruthenium metal species selected from the group consisting of less than 10 nm, 9 nm, 8 nm, 7 nm, 6 nm, 5 nm, 4 nm, 3 nm, 2 nm and 1 nm. In one embodiment, one or more of the catalytic promoter species are in contact with the ruthenium metal species.

In some examples, the molar ratio of the ruthenium metal species to support material may be between about 1:10 and 10:1, for example about 1:10 to about 1:1 or 1:5 to 2:1. In one example, the molar ratio of the ruthenium metal species to support material is between about 1:2 to about 2:1.

Transport Promoter Species

The catalyst compositions may further comprise one or more transport promoter species, as shown in FIGS. 1*a* and 1*b*. The transport promoter species facilitates in the migration of hydrogen in the catalyst composition, which may lead to increased catalytic efficiency, such as an enhanced synthesis rate of ammonia. The addition of the transport promoter species can therefore extend the reaction zones provided by the catalyst composition by extending the path for a mobile hydrogen species such as atomic hydrogen to move within the catalyst composition.

In some embodiments, the transport promoter species may be selected from the group consisting of molybdenum, tungsten, iron, cobalt, boron, chromium, tantalum, osmium, palladium, platinum, nickel, and any combinations thereof. In one example, the transport promoter species is a palladium metal species. In another example, the transport promoter species is palladium or palladium oxide (PdO).

In some embodiments, the transport promoter species is provided in an amount of about 1 wt % to about 20 wt % of the total mass of the catalyst composition. In one embodiment, the transport promoter species is provided in an amount of about 5% wt of the total mass of the catalyst composition.

The transport promoter species may be provided on the oxide support material or on the ruthenium metal species. In one embodiment, the transport promoter species may be provided in the catalyst composition as a discrete component, such as not being bound or fixed to any other component in the catalyst composition (e.g. provided as individual particulates). For example, FIGS. 1*a-c* show the transport promoter material can be provided as a discrete particle within the catalyst composition.

In one embodiment, the catalyst composition comprises or consists of a ruthenium metal species, one or more catalytic promoter species, a support material, and a transport promoter species. It will be appreciated that previous embodiments or examples as described for these components of the composition may be provided, for example the support material may be an oxide support material comprising the ruthenium metal species and two or more catalytic promoter species. In another example, the catalyst composition comprises or consists of ruthenium metal nanoparticles, one or more catalytic promoter species, an oxide support material, and a transport promoter species, wherein the transport promoter species is provided in the catalyst composition as a discrete component (e.g. one or more transport promoter particles).

In another example, the catalyst composition comprises ruthenium metal nanoparticles, one or more catalytic promoter species, an oxide support material, and a transport promoter species, wherein the one or more catalytic promoter species is provided on the ruthenium metal nanoparticles and/or the oxide support material.

The transport promoter species may be provided in the catalyst composition in an amount of from about 1 wt % to about 20 wt % of the total mass of the catalyst composition. In some embodiments, the transport promoter species may be provided in the catalyst composition in an amount of from about 2 wt % to about 10 wt %, for example of from about 5 wt % to about 10 wt % of the total mass of the catalyst composition. In some embodiments, the transport promoter species may be provided in the catalyst composition in an amount of less than about 10 wt % of the total mass of the catalyst composition. In some examples, the transport promoter species is provided in the catalyst composition in an amount (wt % of the total mass of the catalyst composition) of at least about 1, 2, 3, 4, 5, 6, 7, 8, 9, 10, 11, 12, 13, 14, 15, 16, 17, 18, 19 or 20. In some examples, the transport promoter species is provided in the catalyst composition in an amount (wt % of the total mass of the catalyst composition) of less than about 20, 19, 18, 17, 16, 15, 14, 13, 12, 11, 10, 9, 8, 7, 6, 5, 4, 3, 2, or 1. The transport promoter species may be provided in the catalyst composition in a range (wt % of the total mass of the catalyst composition) provided by any two or more of these upper and/or lower amounts, for example in a range of between about 2 to 15 wt %.

As shown in FIG. 1*c*, the transport promoter species can provide further advantages to the ruthenium supported promoter catalyst or composition thereof. FIG. 1*c* shows a catalyst composition according to one embodiment of the present disclosure comprising hybrid particles present at an interface (e.g. as a coating) on a hydrogen species permeable membrane. The catalyst composition (including hybrid Ru-ceria particles comprising catalytic promoters) also comprise transport promoter species, for example palladium as a hydrogen transport promoter. The transport of hydrogen from the membrane at the interface with the catalyst (e.g. Ru-ceria particle comprising catalytic promoters and transport promoter species) is further assisted by the presence of the transport promoter species.

Additional Additives

It will be appreciated that the catalyst composition as described herein may optionally comprise one or more additional additives. The additional additives may be a proton absorbing/desorbing metal species which can increase the resident time of a reactant species within the catalyst composition. For example, the catalyst composition may optionally comprise a proton absorbing/desorbing metal species which enhances the synthesis rate of ammonia by increasing the resident time of hydrogen in the catalyst composition and/or assisting the transport of the hydrogen from the membrane surface to the catalyst.

In some embodiments, the optional additional additive may be a hydrogen absorbing material, a hydrogen desorbing material, or a combination or alloy thereof. For example, the optional additional additive can be selected from the group consisting of zirconia, ceria, nickel oxide, and tantalum. The optional additional additive may also be an alloy, such as a zirconia-nickel oxide alloy (i.e. $Zr_7O$—$Ni_3O$) and a magnesium-nickel alloy (i.e. Mg—Ni). In one embodiment, the optional additional additive is ceria. The ceria may be nano ceria (i.e. have an average particle size of less than 100 nm).

In some examples, the one or more additional additives are provided in the catalyst composition in an amount (wt % of the total mass of the catalyst composition) of at least about 1, 2, 3, 4, 5, 6, 7, 8, 9, 10, 11, 12, 13, 14, 15, 16, 17, 18, 19 or 20. In some examples, the one or more additional additives are provided in the catalyst composition in an amount (wt % of the total mass of the catalyst composition) of less than about 20, 19, 18, 17, 16, 15, 14, 13, 12, 11, 10, 9, 8, 7, 6, 5, 4, 3, 2, or 1. The one or more additional additives may be provided in the catalyst composition in a range (wt % of the total mass of the catalyst composition) provided by any two or more of these upper and/or lower amounts, for example in a range of between about 2 to 15 wt %.

Triply Promoted Catalyst Compositions

In one embodiment, the catalyst compositions comprise a ruthenium metal species and three catalytic promoter species, which are supported on an oxide support material, i.e. a triply promoted catalyst composition. For example, the catalyst composition may comprise a ruthenium metal species and at least three catalytic promoter species, K, Cs and Ba, which can be all supported on ceria. These catalyst compositions may be provided in or on a hydrogen species permeable membrane, e.g. palladium membrane. In one particular embodiment, the triply promoted catalyst compositions can be used in ammonia synthesis.

Figures 2A, 2B:
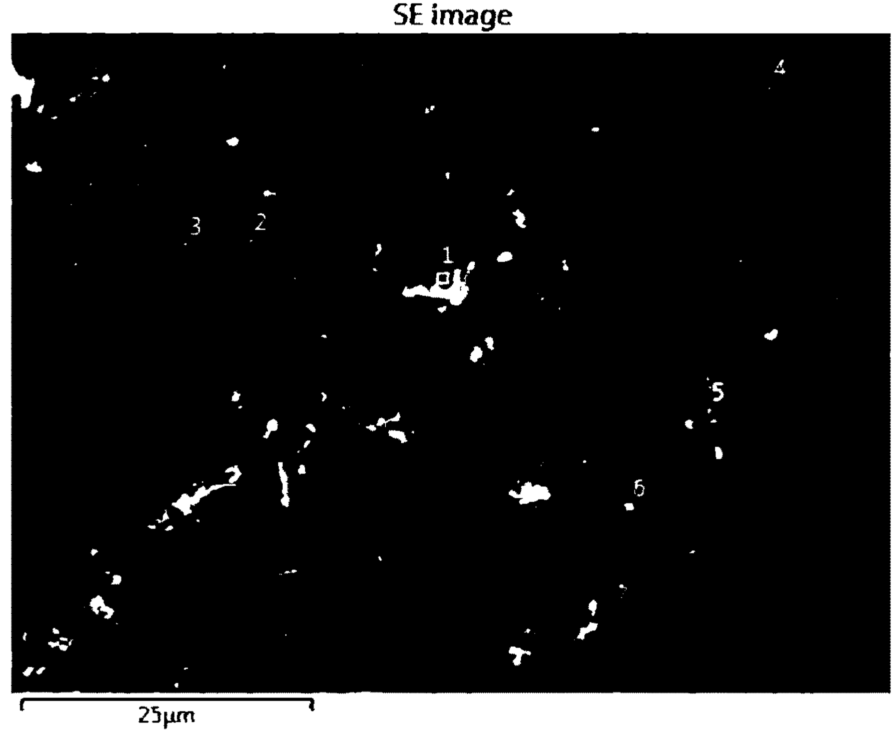
FIG. 2*a* provides a scanning electron microscopy (SEM) image of a palladium membrane coated with a catalyst composition according to one embodiment of the present disclosure comprising an oxide support material (ceria), Ru metal species, and Cs, K and Ba promoter species.
FIG. 2*b* provides an energy dispersive spectroscopy (EDS) map taken at point 1 of the SEM image highlighting the elemental composition of a coated membrane according to one embodiment of the present disclosure.

For example, as seen in FIG. 2*a*, a catalyst composition comprising a ruthenium metal species and the three promoters, K, Cs, Ba, on a ceria support can be prepared. FIG. 2*b* provides an elemental analysis of the catalyst composition at point 1, which confirms the presence of peaks corresponding to Ru (ruthenium metal species), K, Ba and Cs (promoters), and Ce and O (ceria).

Figure 3:
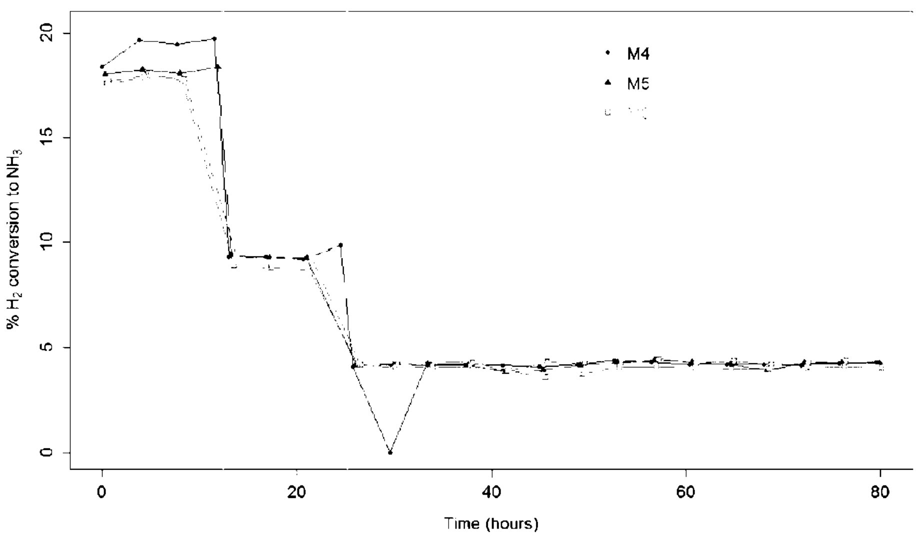
FIG. 3 demonstrates the performance of various ammonia synthesis catalyst compositions (M4, M5 and M6) comprising oxide support material, Ru metal species and promoter species according to some embodiments of the present disclosure.

Further advantages may be provided by the triply promoted catalyst compositions according to some embodiments of the present disclosure, such as excellent catalytic properties. In one example, the triply promoted catalyst compositions are triply promoted ammonia synthesis catalyst compositions. Without wishing to be bound by theory, it is believed that including three different catalytic promoters, (e.g. Ba, K and Cs) in the ammonia catalyst composition can enhance the catalytic activity of the catalyst composition and/or provide good stability during use. Some of the catalytic promoter species (e.g. Cs and K) can act as an electronic promoter which assists in the transfer of electrons to the active ruthenium metal surface, which can lower the $N_2$ dissociating barrier which may result in increased catalytic efficiency, while some other catalytic promoter species (e.g. Ba) can act as a structural promoter and modify the local arrangement of the surface ruthenium atoms on the ruthenium metal to create highly active sites for catalysis (also known as $B_5$ sites). As a result, the triply promoted ammonia catalyst composition can demonstrate high % $H_2$ conversion to ammonia/gram through both structural and electronic promotion by using three different catalytic promoter species. For example, referring to FIG. 3, when used in ammonia synthesis, a triply promoted catalyst composition (e.g. Ru metal species, ceria support, K, Cs and Ba promoter) provided excellent $H_2$ conversion to ammonia.

Figure 6:
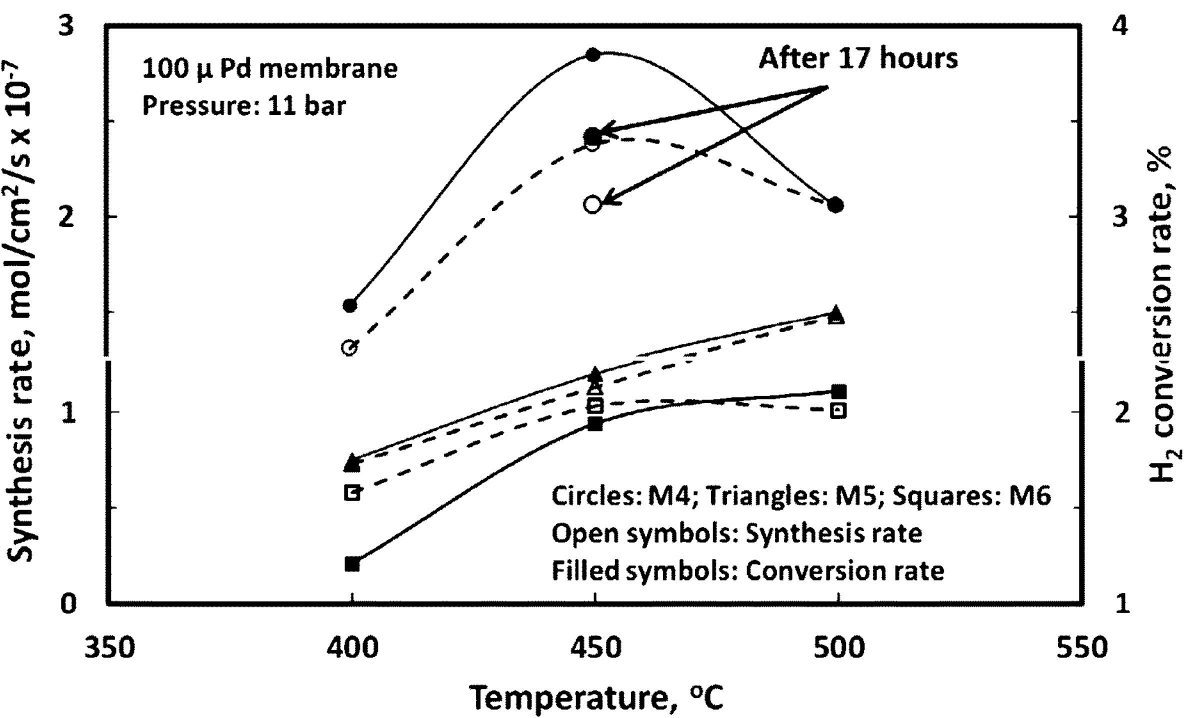
FIG. 6 shows synthesis rate and % $H_2$ conversion rates of three ammonia synthesis catalyst compositions (M4, M5 and M6) according to some embodiments of the present disclosure on a 100 μm thick Pd membrane at varying temperatures and reaction times.

Additional advantages may also be provided in some embodiments, such as excellent stability when the catalyst compositions are used in ammonia synthesis. For example, referring to FIG. 4, a triply promoted catalyst composition (e.g. Ru metal species, ceria support, with the three promoters, K, Cs and Ba) when used in ammonia synthesis can maintain high $H_2$ conversion to ammonia over numerous cycles. Referring to FIG. 6, a triply promoted catalyst composition (e.g. Ru metal species, ceria support, promoters) provided increased synthesis rates (SR) and hydrogen to ammonia conversion rates (CR) ($2.34\times10^{-7}$ mol/cm$^2$/s and 3.85%) after 17 hours of continued synthesis, highlighting the ammonia catalyst compositions stability.

Catalyst Hybrid Particles

The catalyst composition may exist as a mixture of components, such as a mixture comprising a ruthenium metal species, one or more catalytic promoter species, an oxide support material, optionally one or more transport promoter species, and optionally one or more additional additives. In another example, the catalyst composition may comprise a ruthenium metal species on an oxide support material further comprising at least one additional material selected from a catalytic promoter species and a transport promoter species. In one embodiment, the catalyst composition comprises a ruthenium metal species, an oxide support material, one or more catalytic promoter species, and a transport promoter species. In one particular embodiment, the catalyst composition comprises one or more catalyst hybrid particles and optionally one or more transport promoter species. In one example, each catalyst hybrid particle consists of an oxide support particle comprising one or more ruthenium metal particles and one or more catalytic promoter species, for example at least three catalytic promoter species.

Figure 12:
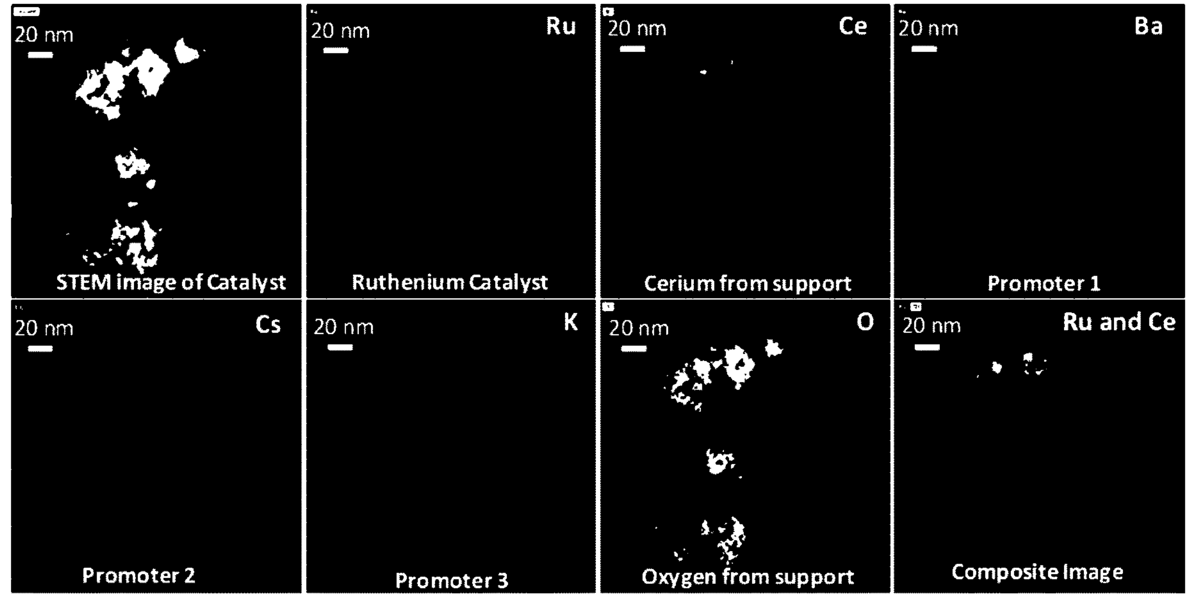
FIG. 12 shows scanning transmission electron microscope (STEM) Image and elemental mapping of as-prepared for an M4 catalyst using synthesis method described in Example 1 according to one example of the present disclosure. Elemental maps were obtained with High-angle annular dark-field (HAADF) imaging mode of STEM.

For example, the oxide support material may be a particle (e.g. a nanoparticle), wherein the ruthenium metal species and catalytic promoter species are provided on the oxide support material particle. As such, it will be understood that in some embodiments, the oxide support material, ruthenium metal species and catalytic promoter species may form a hybrid particle. In some embodiments, the hybrid particle may be a ceria-ruthenium-catalytic promoter hybrid particle. For example, the hybrid particle may comprise a single ceria nanoparticle, wherein the ruthenium metal species (i.e. one or more ruthenium nanoparticles) and catalytic promoter species (i.e. one or more of Cs, K and/or Ba) are provided on the surface of the ceria nanoparticle, as seen in FIGS. 1*a-c*, 2*a-b*, and 12, thereby forming a hybrid particle. FIGS. 2*a*, 2*b* and 12, show that the ruthenium metal species and catalytic promoter species can be supported on the oxide support material. It will be appreciated that the catalyst composition may comprise one or more of the hybrid particles. Where the catalyst composition comprises a hybrid particle comprising an oxide support material, ruthenium metal species and a catalytic promoter species, it will be appreciated that the morphology of the hybrid particle may vary and is not intended to be limited to any specific structural arrangement or shape.

In some embodiments, the catalyst composition may comprise a hybrid nanoparticle as described above and a transport promoter species (e.g. as independent transport promoter particles in addition to the hybrid particles). As such, in this embodiment, it will be appreciated that the transport promoter species is not part of the hybrid particle and rather a discrete component of the catalyst composition. In other embodiments, the transport promoter species may also be present on and/or in close proximity to the hybrid particle. For example, as seen in FIGS. 1*a-c*, the catalyst composition may comprise a hybrid particle (e.g. ceria/Ru/Cs, K, and/or Ba, hybrid particle, and optionally transport promoter species (e.g. Pd/PdO). The catalyst composition comprising the hybrid particles and the transport promoter particles can provide further advantages such as the extending of the reaction zones by extending the path for hydrogen to move within the catalyst composition (see FIG. 1*c*).

Catalyst Compositions and Uses

A catalyst composition can be provided comprising a plurality of reactive sites provided by the ruthenium metal species, one or more catalytic promoter species, a support material, and optionally a transport promoter species, for promoting a reaction between the first and second reactants.

The catalyst composition may be provided as part of a surface modification (e.g. coating comprising a ruthenium supported catalyst according to any embodiments or examples thereof as described herein) of a membrane surface. The catalyst composition may be interspersed in or on the surface modification. The surface modification may comprise a roughened surface layer further comprising a coating comprising the catalyst composition. The catalyst composition may be interspersed in or on the roughened surface. The catalyst composition may be interspersed, incorporated or imbedded within a membrane surface.

The surface modification can comprise a roughened surface layer and a plurality of reactive sites comprising the catalyst composition comprising ruthenium metal species, and catalytic promoter species, transport promoter species and a support material, wherein the catalyst composition is interspersed with the roughened surface layer for promoting the reaction between the first and second reactants.

The catalyst composition may be provided as a coating composition for application to a membrane surface. The catalyst composition may therefore be provided in a membrane coating, the catalyst composition comprising or consisting of a ruthenium metal species, one or more catalytic promoter species, a support material, optionally one or more transport promoter species, and optionally one or more additives. Additional additives, such as binders, may facilitate coating of the catalyst composition to a membrane. The catalyst composition or coating thereof may be provided as a partial coating or a complete layer on the membrane. The catalyst composition or coating thereof may be provided on one or both sides or surfaces of a membrane, which may be individually selected for each side. The catalyst composition may be selected to facilitate dissociation, migration or reaction of any species involved in a synthesis process. The catalyst composition may be deposited on a membrane by brush coating, painting, slurry spraying, spray pyrolysis, sputtering, chemical or physical vapour deposition techniques, electroplating, screen printing, or tape casting.

Processes for Preparing Ruthenium Promoter Catalyst

A ruthenium promoter catalyst according to at least some examples as described herein may be prepared according to the following process. The processes can comprise the use of liquid systems for suspending solid particulates and coating thereof with various species (e.g. ruthenium and/or catalytic promoter species).

In one embodiment, the process for preparing the ruthenium promoter catalyst may comprise the steps of:

i) providing a polar solvent system comprising a ruthenium supported on particulate material and one or more catalytic promoter species independently selected from the group consisting of La, Rb, Y, Yb, K, Cs, and Ba, or hydroxides, nitrates or oxides thereof; and ii) removing the polar solvent system to obtain the ruthenium promoter catalyst.

The ruthenium promoter catalyst prepared in the processes as described herein can be obtained as a solid composition comprising the ruthenium promoter catalyst. The ruthenium promoter catalyst may be obtained as a plurality of individual oxide support particles each comprising a plurality of particles dispersed thereon selected from ruthenium particles and catalytic promoter species particles. It will be appreciated that the ruthenium promoter catalyst prepared in the process may also be provided according to various embodiments or examples of the ruthenium promoter catalyst as described herein (e.g. hybrid particles). For example, FIGS. 1*a* and 1*b* provide a representation of the catalyst particles according to one example of the present disclosure, with TEM image of prepared particles shown in FIG. 12.

The ruthenium supported on particulate material used in the process (e.g. step i) can be provided as a particulate suspension in the polar solvent system. The ruthenium supported on particulate material may be provided as a plurality of individual oxide support particles, wherein each individual oxide support particle comprises a plurality of ruthenium particles dispersed thereon.

In an example of step i), the one or more catalytic promoter species can be dissolved in the polar solvent system. In another example, two or more catalytic promoter species are dissolved in the polar solvent system. In another example, three or more catalytic promoter species are dissolved in the polar solvent system. A suspension of the ruthenium supported on particulate material in the polar solvent system can therefore be provided wherein the catalytic species is dissolved therein. This process can provide improved uniformity and dispersion of the catalytic promoter species (e.g. as nanoparticles) on the ruthenium support material (e.g. Ru-ceria particles), which is shown in FIG. 12.

The concentration of the catalytic promoter species in the polar solvent system may be between about 0.001 to 10 M, for example between about 0.1 to 10 M or between about 0.1 and 1.5 M.

The polar solvent system may be an aqueous solvent system. The polar or aqueous solvent system may comprise water soluble polar organic compounds (e.g. alcohols) and/or water (e.g. deionised water). It will be appreciated that other solvents may be used as a carrier in the solvent system for providing a suspension of the Ru-support material and solution of catalytic promoter species or precursor thereof.

In step i) the process can further comprise stirring and/or sonicating. It will be appreciated that other methods may be provided that can be directed to mixing and agitating the liquid system. The sonication has been shown to provide improved uniformity and dispersion of the catalytic promoter species (e.g. as nanoparticles) on the ruthenium support material (e.g. Ru-ceria particles), which is shown in FIG. 12. Sonication has also been found to be particularly effective at reducing aggregation of support material (e.g. ceria particles). The overall process can also facilitate prevention or reduction in aggregation of particles.

The process can comprise a prior process of preparing the ruthenium supported on particulate material. In one embodiment, the process of preparing the ruthenium supported on particulate material comprises the steps of:

a. providing a plurality of individual oxide support particles as a suspension in an organic solvent system comprising a ruthenium precursor;
b. removing the organic solvent system to provide a solid composition; and
c. heating the solid composition to provide the ruthenium supported on particulate material.

The ruthenium precursor in step a) may be provided according to any embodiment or example of the ruthenium precursor as described herein. In one example, the ruthenium precursor is provided by a ruthenium carbonyl compound (e.g. $Ru_3(CO)_{12}$). In an embodiment, the ruthenium precursors is soluble in the organic solvent system. The concentration of the ruthenium precursor in the organic solvent system may be between about 0.001 to 0.1 M, for example between about 0.005 to 0.1 M or about 0.01 M.

The organic solvent system can be selected to dissolve the ruthenium precursor while retaining the oxide support material as a particulate suspension. This can facilitate the uniformity and dispersion of ruthenium on the oxide support particles. The organic solvent system may be provided by a polar non-protic solvent, for example THF.

The oxide support material or particles thereof may be provided by any embodiments or examples thereof as described herein. As mentioned, the process can provide a suspended slurry of the oxide support material in the organic solvent system.

The process may further comprise contacting (e.g. mixing) organic solvent system containing suspended particulates and dissolved promoter species for a predetermined duration. The pre-determined duration may be (in minutes) 5, 10, 15, 30, 60, 90, 180, 360, or 720.

The removing of the organic solvent system in step b) may be drying, for example under vacuum.

The heating of the solid composition in step c) may be at a temperature of between about 200 to 400° C., between about 250 and 350° C., or about 300° C. The heating may also be conducted under vacuum. The solid composition may also be allowed to cool under vacuum following the heating step. It will be appreciated that the heating step converts ruthenium precursor material into ruthenium metal (e.g. ruthenium particles dispersed on the surface of the oxide support particles).

The process may also comprise the addition of transport promoter species (e.g. palladium particles) to obtain a ruthenium promoter catalyst comprising the transport promoter particles.

Membranes

According to the present disclosure, membranes may be prepared comprising a catalyst composition according to any embodiments or examples thereof as described herein. For example, the catalyst composition may comprise or consist of one or more ruthenium metal species, one or more catalytic promoter species, one or more support materials, optionally one or more transport promoter species, and optionally one or more additional additives. The membrane may be a nitrogen or hydrogen species selectively permeable solid membrane (NSPM or HSPM), for example a solid membrane that is permeable to nitrogen or hydrogen.

In one embodiment, the nitrogen or hydrogen species selectively permeable solid membrane (NSPM or HSPM) may be formed from a nitrogen or hydrogen permeable material selected from the group consisting of palladium, titanium, vanadium, zirconium, niobium, tantalum, and any alloy thereof including any alloy with at least one of silver, copper, chromium, iron, nickel and cobalt. The NSPM or HSPM may have at least one side of the membrane which has a surface modification (e.g. coating) that is porous to a hydrogen or nitrogen species. The surface modification may comprise a catalyst composition including any coating thereof. The surface modification may comprise a catalyst composition that is at least partially coated and/or interspersed in or on the surface of the membrane.

HSPM Membrane

According to the present disclosure, processes and reactions may be carried out using a hydrogen species selectively permeable membrane (HSPM), for example a solid membrane that is selectively permeable to a mobile hydrogen species for reaction with a second reactant. The membrane comprises a hydrogen species receiving side and a product synthesis side. A hydrogen species source comprising a mobile hydrogen species can be provided to the hydrogen species receiving side and a second reactant source can be provided to the product synthesis side of the membrane. It has been found that the migration of a hydrogen species across a HSPM membrane to a product synthesis side that has been surface modified can result in an effective reaction with a second reactant source to provide a desired product.

It will be appreciated that the hydrogen species source can provide a source of a first reactant in the form or species that can migrate through the membrane, or at least a source capable of conversion in situ into a form or species that can migrate through the membrane. For example, a hydrogen species source may comprise or consist of molecular hydrogen. Molecular hydrogen may in situ undergo dissociation at or near the surface of the membrane to provide mobile hydrogen species capable of migration through the membrane. It will be appreciated that the mobile hydrogen species may be a positively and/or negatively charged species, such as a hydride or proton, which may depend on the selected membrane and type of process being undertaken.

The HSPM membrane, or substrate thereof, may be formed from materials selected from at least one of the following:

- one or more hydrogen transporting metals, for example palladium (Pd), titanium (Ti), vanadium (V) and nickel (Ni);
- one or more alloys of hydrogen transporting metals, for example alloys of palladium including palladium-silver (Pd—Ag) alloy, palladium-copper (Pd—Cu) alloy, palladium-iron (Pd—Fe) alloy, palladium-ruthenium (Pd—Ru) alloy, palladium-cobalt-molybdenum (Pd—Co—Mo) alloy; or alloys of hydrogen transporting metals with one or more transition metals including V, Nb, Ta and Zr;
- one or more cermets, which may comprise at least one of the above metals or alloys and a ceramic, for example a proton conducting ceramic, which may provide advantages of structural stability and enhanced hydrogen transport or a non-conducting ceramic which may provide advantages of structural stability.

In an embodiment, the HSPM membrane is formed from a hydrogen permeable material selected from the group consisting of palladium, titanium and nickel, an alloy of palladium, titanium, vanadium, zirconium, niobium, tantalum, and any combinations thereof, and any alloys thereof with silver, copper, chromium, iron, nickel, cobalt, and any combination thereof. In yet a further embodiment, the HSPM membrane is formed from a hydrogen permeable material selected from the group consisting of palladium and an alloy of palladium with any one or more of silver, copper, chromium, iron, nickel and cobalt.

In another embodiment, the membrane materials are selected from Pd or a Pd alloy, such as Pd—Cu alloy and Pd—Ag alloy, or a Pd alloy including a transition metal selected from at least one of V, Zr, Ta and Nb.

The thickness of the membrane (without surface modification) may be selected depending on the process and reaction being undertaken. The thickness of the membrane may be between any one of the following ranges (in μm) about 10 and 500, about 20 and 400, about 30 and 300, about 40 and 200, or about 50 and 150. The thickness of the membrane may be at least about 10 μm, 30 μm, 50 μm, 70 μm, or 90 μm. The thickness of the membrane may be less than about 800 μm, 600 μm, 400 μm, or 200 μm.

The HSPM membrane may have a surface modification on at least one side of the membrane. The surface modification may be porous to a hydrogen species.

NSPM Membrane

According to the present disclosure, the processes and reactions may be carried out using a nitrogen species selectively permeable membrane (NSPM), for example a solid membrane that is selectively permeable to a mobile nitrogen species for reaction with a second reactant. The membrane comprises a nitrogen species receiving side and a product synthesis side. A nitrogen species source comprising a mobile nitrogen species can be provided to the nitrogen species receiving side and a second reactant source can be provided to the product synthesis side of the membrane. It has been found that the migration of a nitrogen species across a NSPM membrane to a product synthesis side that has been surface modified can result in an effective reaction with a second reactant source to provide a desired product.

It will be appreciated that the nitrogen species source can provide a source of a first reactant in the form or species that can migrate through the membrane, or at least a source capable of conversion in situ into a form or species that can migrate through the membrane. For example, a nitrogen species source may comprise or consist of molecular nitrogen. Molecular nitrogen may in situ undergo dissociation at or near the surface of the membrane to provide mobile nitrogen species capable of migration through the membrane. It will be appreciated that the mobile nitrogen species may be a positively and/or negatively charged species, such as a nitride, which may depend on the selected membrane and type of process being undertaken. It will be appreciated that the mobile nitrogen species may be atomic nitrogen.

The NSPM membrane, or substrate thereof, may be formed from materials selected from at least one of the following:

- one or more nitrogen transporting metals, for example vanadium, niobium, and tantalum;
- one or more alloys of nitrogen transporting metals, for example alloys of vanadium, niobium, and tantalum, with silver, copper, iron, ruthenium, cobalt or molybdenum;
- one or more nitrogen transporting metals or alloys of transporting metals, which may comprise at least one of the above metals or alloys, and a secondary metal, for example a secondary metal selected from iron (Fe), ruthenium (Ru), cobalt (Co), nickel (Ni), palladium (Pd), platinum (Pt), copper (Cu), gold (Au), and silver (Ag) which may provide advantages of structural stability and enhanced nitrogen transfer.

In an embodiment, the NSPM membrane is formed from a nitrogen permeable material selected from the group consisting of vanadium, niobium, and tantalum, or an alloy thereof.

In another embodiment, the NSPM membrane is formed from a nitrogen permeable material selected from the group consisting of vanadium, niobium, and tantalum, or an alloy thereof, and any alloys thereof with iron, ruthenium, cobalt, nickel, palladium, platinum, copper, gold and silver, and any combination thereof. In yet a further embodiment, the NSPM membrane is formed from a nitrogen permeable material selected from the group consisting of vanadium and an alloy of vanadium with any one or more of silver, ruthenium, copper, iron, nickel, palladium, platinum and cobalt. In another embodiment, the NSPM membrane is formed from a nitrogen permeable material selected from the group consisting of niobium and an alloy of vanadium with any one or more of silver, ruthenium, copper, iron, nickel palladium, platinum and cobalt. In yet a further embodiment, the NSPM membrane is formed from a nitrogen permeable material selected from the group consisting of tantalum and an alloy of vanadium with any one or more of silver, ruthenium, copper, iron, nickel palladium, platinum and cobalt.

The permeability of the membrane may be at least $1\times10^{-8}$ mol/(m s $Pa^{0.5}$) at 1000 K (727° C.). The permeability of the membrane may be in the range of about $1\times10^{-8}$ mol/(m s $Pa^{0.5}$) to about $1\times10^{-7}$ mol/(m s $Pa^{0.5}$) at 1000 K (727° C.). The thickness of the membrane (without surface modification) may be selected depending on the process and reaction being undertaken. The thickness of the membrane may be between any one of the following ranges (in μm) about 10 and 500, about 20 and 400, about 30 and 300, about 40 and 200, or about 50 and 150. The thickness of the membrane may be at least about 10 μm, 30 μm, 50 μm, 70 μm, or 90 μm. The thickness of the membrane may be less than about 800 μm, 600 μm, 400 μm, or 200 μm.

The NSPM membrane may have a surface modification on at least one side of the membrane. The surface modification may be porous to a nitrogen species.

A coating or layer may be provided on the NSPM or HSPM comprising a catalyst composition catalyst according to any embodiments or examples as described herein (see example in FIG. 1*c*). For example, the catalyst composition may comprise or consist of a ruthenium metal species, one or more catalytic promoter species, a support material, optionally one or more transport promoter species, and optionally one or more additives. In one example, the catalyst composition comprises a ruthenium metal species, an oxide support material, one or more catalytic promoter species, and a transport promoter species. For example, the catalyst composition may comprise or consist of an oxide support material comprising a ruthenium metal species and two or more catalytic promoters (e.g. three or more catalytic promoter species), and optionally a transport promoter species. The membrane may comprise one or more coatings.

Processes Using Ruthenium Promoter Catalyst

It will be appreciated that the above catalyst compositions and/or membranes may be used for synthesising a reaction product by a hydrogen insertion or hydrogenation reaction, wherein one example is synthesising ammonia from a hydrogen species source and a second reactant source that is a nitrogen species source.

In some embodiments, the processes described herein can provide a method of inserting hydrogen into a range of compounds, such as compounds containing carbon-oxygen, nitrogen-nitrogen, carbon-carbon including double and triple bonded carbon (e.g. alkenes and alkynes), carbon-nitrogen, and oxygen-oxygen multiple bonds.

In an embodiment, there is provided a hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, wherein at least one side of the membrane, or portion thereof, comprises a surface modification comprising a layer that is porous and contains within the layer a plurality of reactive sites comprising at least a ruthenium metal species.

It will be appreciated that the ruthenium metal species is provided as a catalyst for promoting a reaction within the layer between two or more reactants. In an embodiment, the HSPM is for producing ammonia from a pressure driven system by reaction of a first reactant, provided by a hydrogen species source, with a second reactant, provided by a nitrogen species source, wherein the surface modification comprises a layer that is porous to the second reactant and contains a plurality of reactive sites comprising at least a ruthenium metal species for promoting a reaction within the layer between the first and second reactants to form the product.

In another embodiment, there is provided a hydrogen species selectively permeable solid membrane (HSPM) formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, wherein at least one side of the membrane, or portion thereof, comprises a surface modification according to any embodiments or examples as described herein.

In another embodiment, there is provided a hydrogen species selectively permeable solid membrane (HSPM) for producing ammonia from a pressure driven system by reaction of permeable hydrogen species source with a nitrogen species source, wherein the membrane is formed from a hydrogen permeable material selected from the group consisting of palladium, titanium and nickel, an alloy of palladium, titanium, vanadium, zirconium, niobium, tantalum or alloys of one or more from this group with silver, copper, chromium, iron, nickel or cobalt, and a cermet thereof, and the membrane further comprises a surface modification comprising a layer that is porous to the nitrogen species source and contains within the layer a plurality of reactive sites comprising at least a ruthenium metal species for promoting a reaction within the layer between the hydrogen species and the nitrogen species for forming ammonia.

As described previously, it will be appreciated that the reactive sites are provided throughout the surface modified layer, for example the reactive sites are located internally within the layer. The reactive sites may be further enhanced by providing in the surface modification, composition, or coating, optionally one or more additional metal species, optionally one or more promoters, and optionally one or more additives according to any embodiments or examples as described herein.

In an embodiment, there is provided a hydrogen species selectively permeable solid membrane (HSPM) for producing ammonia from a pressure driven system. The membrane may comprise a hydrogen permeable material selected from the group consisting of palladium, titanium and nickel, an alloy of palladium, titanium, nickel, alloy thereof, and combination thereof. The HSPM may comprise a surface modification, for example a coating comprising a catalyst composition according to any embodiments thereof as described herein.

As previously described for the above processes, it will be appreciated that the "pressure driven system" simply provides a differential partial pressure that drives the reaction, and it is not necessary to provide a pressure system with a constant high pressure, although variations regarding pressures may form embodiments of the above aspects to provide further advantages.

When the reaction process is directed to produce ammonia and the second reactant source comprises a source of nitrogen, such as molecular nitrogen, molecular nitrogen can adsorb on the product synthesis side of the membrane and dissociate to provide a nitrogen species for reaction with the migrated mobile hydrogen species to produce ammonia.

As described above, the application of a partial pressure differential of hydrogen across the membrane can drive the migration of the hydrogen species through the membrane from the hydrogen species receiving side to the product synthesis side. The surface hydrogen concentration on the hydrogen species receiving side of the HSPM is one factor associated with the flux of hydrogen species transmitted or migrated through the membrane. The flux of hydrogen species through the membrane can be controlled by selecting higher concentrations of hydrogen species provided on the hydrogen species receiving side of the membrane relative to the product synthesis side of the membrane to impart a concentration gradient and drive migration of the hydrogen species through the membrane (e.g. partial pressure differential when source is a gas). For example, a gaseous source of hydrogen species may be provided at varying concentrations and pressures to the hydrogen species receiving side of the membrane, while providing a second reactant source that does not provide a source of hydrogen species. The flux of hydrogen species migrating through the membrane can also be controlled by other factors including the selection of the particular type of membranes, temperatures and pressures.

The hydrogen species source provides a source of mobile hydrogen species capable of migration through the solid membrane for reaction with the second reactant. The first hydrogen species source may provide a source of a first reactant in the form or species that can migrate through the membrane, or at least a source capable of conversion in situ into a form or species that can migrate through the membrane. For example, a hydrogen species source may comprise or consist of molecular hydrogen. Molecular hydrogen may in situ undergo dissociation at or near the surface of the membrane to provide mobile hydrogen species capable of migration through the membrane. It will be appreciated that the mobile hydrogen species may be a positively and/or negatively charged species, such as a hydride or proton, which may depend on the selected membrane and type of process being undertaken. This transmission process may be facilitated by the use of one or more catalysts on i) the hydrogen species receiving side of the membrane, ii) the product synthesis side of the membrane, or iii) on both sides of the membrane.

It will be appreciated that the second reactant source provides a source of the second reactant for reaction on the product synthesis side of the membrane with the mobile hydrogen species that has migrated through the membrane. The second reactant source may provide a second reactant for reaction with the hydrogen species, or at least provide a source capable of conversion into a form or species that can react with the hydrogen species. For example, the second reactant source may comprise or consist of molecular nitrogen. Molecular nitrogen may be converted in situ into a nitrogen species capable of reaction with the hydrogen species. For example, molecular nitrogen may be converted at or near the product synthesis side of the membrane to a reactive species, which may adsorb to the membrane for reaction with the hydrogen species. The reaction on the product synthesis side of the membrane may also be facilitated by the use of one or more catalysts.

It will be appreciated that a range of products may be obtained from the process, for example products obtained from a hydrogen insertion or hydrogenation reaction. The process may cover production of a range of inorganic and organic compounds, and for example may involve the following types of reactions and products:

- Hydrogenation or hydrogen insertion with a nitrogen species or compound comprising nitrogen, for example reaction of a hydrogen species and a nitrogen species to form ammonia;
- $CO_2$ hydrogenation to produce products such as methanol, formic acid, dimethyl carbonate and carbon monoxide;
- Alkene hydrogenation, for example hexene to hexane or benzene to cyclohexane;
- Alkyne hydrogenation, for example alkyne to alkene and/or alkane, or nitriles to amines.

It will be appreciated that various parameters and conditions used in the process, such as temperatures, pressures and concentration/amounts of materials and reactants, may be selected depending on a range of variables of the process including the product to be synthesised, chemical reaction or mechanisms involved, second reactant source, selection of catalyst(s) used within or coated on the membrane if present, or type of membrane or reactor being used and materials and configuration thereof.

Temperatures (° C.) in relation to the process may be in a range between 0 and 1000, or at any integer or range of any integers therebetween. For example, the temperature (° C.) may be at least about 50, 100, 150, 200, 250, 300, 350, 400, 450, 500, 550, 600, 650, 700, or 750. For example, the temperature (° C.) may be less than about 800, 750, 700, 650, 600, 550, 500, 450, 400, 350, 300, 250, 200, 150, 100, or 50. The temperature may also be provided at about any of these values or in a range between any of these values, such as a range between about 100 to 800° C., about 150 to 700° C., about 200 to 600° C., or 300 to 500° C., or at a range between about 400 to 600° C. or 450 to 550° C., or at about 500° C.

It will be appreciated that reactant sources, namely the hydrogen species source and second reactant source, are typically provided as fluids to facilitate processing operations. Reactant sources that are fluidic may be independently provided in the form of solids, liquids, gases, or mixtures thereof. Depending on the selected operating parameters of the process, the reactant sources may vary in form at different stages in the process. For example, the hydrogen species source or second reactant source may be provided to a reaction chamber from an inlet as a liquid or solid feed (such as any type of carbon or hydrocarbon based fuel, or water as a source of hydrogen species), although in a reaction chamber at operating conditions may react in a different form.

It will be appreciated that the absolute pressures applied during the operation of the process is selected depending on the reaction being undertaken. What is important is that the conditions enable the hydrogen species to migrate through the membrane from the hydrogen species receiving side to the product synthesis side. A partial pressure differential of the hydrogen species source can be provided across the membrane such that the concentration of hydrogen is lower on the product synthesis side than on the hydrogen species receiving side, to thereby effect migration of the hydrogen species through the membrane to the product synthesis side for reaction with the second reactant to form the product. A large pressure differential is not required, provided a positive partial pressure differential of the migrating hydrogen species (through the membrane) is maintained between the sides of the membrane as described above.

Provided a partial pressure differential of hydrogen is maintained across the membrane as described above, the absolute pressures may be in a range of about 1 to 100 bar, or at any integer or range of any integers there between, such as about 1 to 50 bar, about 1 to 20 bar, or about 6 bar. The absolute pressure on the hydrogen species receiving side of the membrane may be the same or different to the absolute pressure on the product synthesis side of the membrane, provided a partial pressure differential of hydrogen is maintained across the membrane as described above. In some embodiments higher pressures may provide further advantages, for example by increasing the concentrations of reacting species or by driving the reaction forward to increase product yield.

The pressure (in bar) on the hydrogen species receiving side of the membrane may be in a range of about 1 to 100, including at any integer or range of any integers therebetween, for example at least about 1, 2, 3, 4, 5, 6, 7, 8, 9, 10, 20, 50, or 100, or less than about 50, 20, 10, 9, 8, 7, 6, 5, 4, 3, 2, or 1. The pressure on the product synthesis side of the membrane may be in the range of about 1 to 100 bar, including at any integer or range of any integers therebetween, for example at least about 1, 2, 3, 4, 5, 6, 7, 8, 9, 10, 20, 50, or 100, or less than about 50, 20, 10, 9, 8, 7, 6, 5, 4, 3, 2, or 1. In one embodiment, the pressure on the product synthesis side of the membrane may be at any pressure less than about 20 bar, for example less than about 10 bar, 9 bar, 8 bar, 7 bar, 6 bar, 5 bar, 4 bar, 3 bar, or 2 bar. In another embodiment, the partial pressure differential between the hydrogen species receiving side of the membrane and the product synthesis side of the membrane may be in a range of 1:100 bar to 100:1 bar, respectively, for example about 2:1 bar, 3:2 bar, 4:3 bar, 5:4 bar, 6:5 bar, or 7:6 bar, or 10:1 bar, 20:1 bar, 50:1 bar respectively.

It will be appreciated that the process may comprise the use of one or more membranes, which may for example be stacked into modules. The one or more membranes may be individually formed from one or more materials selected from metals, alloys and cermets. The one or more membranes may be independently surface modified.

In another embodiment, hydrogen may be provided in substantially pure form generated by electrolysing water. Hydrogen may be supplied by coal gasification or natural gas (NG) reforming, followed by water-gas-shift (WGS) reaction (CO+H2O=CO2+H2), hydrogen separation from a mixture of hydrogen and $CO_2$, and optional hydrogen gas cleaning to remove any impurities. Hydrogen separation from a mixture of hydrogen and $CO_2$, when carbon containing sources are used for hydrogen production, may be optional following water gas shift reaction, and hydrogen and $CO_2$ can be fed directly to the hydrogen species receiving side of the membrane.

The above options for hydrogen source will reduce the overall costs of hydrogen feedstock in the process.

Ammonia Synthesis

The process includes the synthesis of ammonia. It will be appreciated that the above embodiments may apply to the synthesis of ammonia. Further embodiments and aspects more directed to ammonia synthesis are described in further detail as follows.

In an embodiment, there is provided a process for synthesis of ammonia by reaction of at least a hydrogen species with a nitrogen species, the process comprising the steps of:

(i) providing a hydrogen species selectively permeable solid membrane (HSPM) having a hydrogen species receiving side and a product synthesis side;
(ii) providing a hydrogen species source at the hydrogen species receiving side;
(iii) providing a nitrogen species source at the product synthesis side;
(iv) providing a concentration gradient or a partial pressure differential of the hydrogen species source across the HSPM such that the concentration of hydrogen is lower on the product synthesis side than on the hydrogen species receiving side to thereby effect migration of the hydrogen species through the HSPM for reaction with the nitrogen species at or near the surface of the product synthesis side to form ammonia;

wherein at least the product synthesis side of the HSPM has a surface modification according to any of the embodiments described herein.

In one embodiment, the temperatures (° C.) in relation to the process may be provided in a range between about 100 to 800° C., about 150 to 700° C., about 200 to 600° C., or 300 to 500° C., or at a range between about 400 to 600° C. or 450 to 550° C., or at about 500° C.

In another embodiment, the pressure on the product synthesis side of the membrane may be at any pressure less than about 20 bar, for example less than about 10 bar, 9 bar, 8 bar, 7 bar, 6 bar, 5 bar, 4 bar, 3 bar, or 2 bar. In another embodiment, the partial pressure differential between the hydrogen species receiving side of the membrane and the product synthesis side of the membrane may be in a range of 1:50 bar to 50:1 bar, respectively, for example about 2:1 bar, 3:2 bar, 4:3 bar, 5:4 bar, 6:5 bar, or 7:6 bar, or 10:1 bar, 20:1 bar, 50:1 bar respectively.

In relation to ammonia synthesis comprising the use of a hydrogen and nitrogen species, the ruthenium metal species can provide surprisingly enhanced performance at lower relative pressures and/or temperatures. For example, the process may be operated at a pressure of less than about 50 bar, for example at a pressure of between about 5 to 30 bar or between about 7 to 15 bar. The process may be operated at a temperature of less than about 600° C., for example at a temperature of between about 300-500° C. The process can be operated with at least one of the hydrogen and nitrogen flow rates between about 50 to 200 ml/min, which may be increased for membranes with larger surface area or where there are multiple membranes for example a stack of membranes.

In another embodiment, the first reactant is a hydrogen species and the second reactant is a nitrogen species and the process is for synthesizing ammonia. The molar ratio of nitrogen:hydrogen can be provided by the nitrogen species and hydrogen species being between about 1:3 to 3:1.

The flow rate of hydrogen may be at least 50, 60, 70, 80, 90, 100, 110, 120, 130. 140, or 150 ml/min of hydrogen species flow. This flow rate, however may be increased for membranes with larger surface area or where there are multiple membranes for example a stack of membranes.

The flow rate of nitrogen may be at least 50, 60, 70, 80, 90, 100, 110, 120, 130, 140, or 150 ml/min of nitrogen species flow. This flow rate however may be increased for membranes with larger surface area or where there are multiple membranes for example in a stack of membranes.

The synthesis rates (SR) may be at least 0.5, 1, 1.5, 2, 2.5, 3, 3.5, 4, 4.5, 5, 5.5, 6, 6.5, 7, 7.5, 8, 8.5, 9, 9.5 or 10 ($\times10^{-7}$ mol/cm$^2$/s).

The conversion rates (CR) of hydrogen species to ammonia may be at least 0.5, 1, 1.5, 2, 3.5, 4, 4.5, 5, 5.5, 6, 6.5 (based on % of hydrogen species). For example, the CR may be provided wherein the operating parameters are provided by one or more of: achieved with hydrogen permeation rate of 120 ml/min were and 3.1% respectively at 500° C. and 11 bar pressure.

As described in the above embodiments for ammonia synthesis, the membrane is a surface modified hydrogen permeable palladium membrane. The surface modified hydrogen permeable palladium membrane may comprise or consist of a substrate (core layer) comprising a surface modification selected from at least one of a metal sputtered surface and a deposited metal layer, wherein the surface modified membrane comprises an outer coating comprising a ruthenium metal species catalyst.

As described in the above embodiments for ammonia synthesis, the product synthesis side of the membrane comprises an ammonia synthesis catalyst in the form of a ruthenium metal species. For ammonia synthesis, the catalyst is porous to facilitate reaction of the nitrogen species and hydrogen species at the reactive sites (e.g. triple phase boundaries). It will be appreciated that triple phase boundaries are where membrane or membrane material (e.g. Pd or other hydrogen permeable metals) is in contact with the catalyst (e.g. Ru metal species and optionally one or more catalytic promoter species supported on ceria) and nitrogen gas as shown in the example in FIG. 1*c*. To facilitate high ammonia synthesis rates and hydrogen to ammonia conversion rates, the outer layer of the HPSM may be provided with a high number of triple phase boundaries between the hydrogen permeable phase and the ammonia synthesis catalyst (to facilitate reaction of hydrogen species emanating from the membrane with nitrogen species emanating through the porous catalyst). It is important that the catalyst when provided as a coating is suitably adhered to the membrane. It will be appreciated that other ammonia synthesis catalysts may be suitable.

Figure 7:
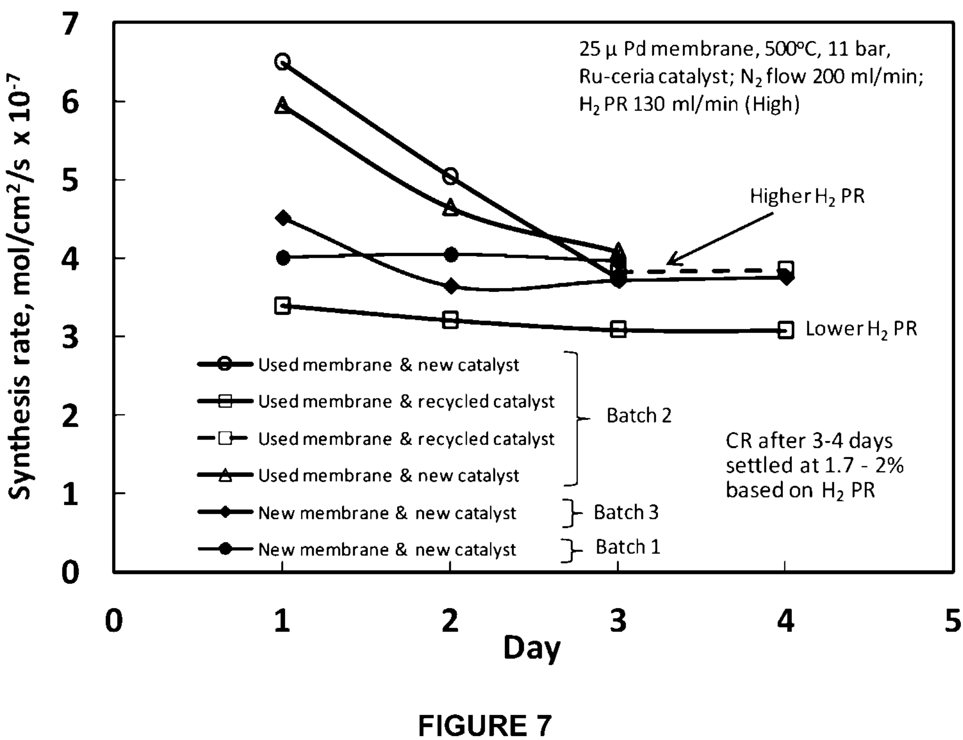
FIG. 7 shows synthesis rates of an ammonia synthesis catalyst composition (M4) according to one embodiment of the present disclosure measured at 500° C. and 11 bar.
Figure 8A:
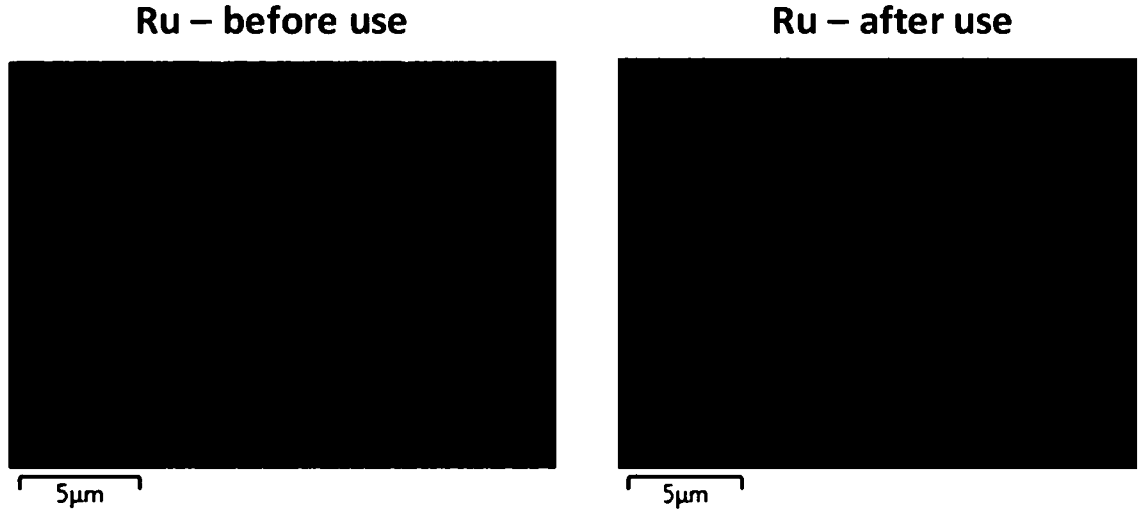
FIG. 8*a* shows an energy dispersive spectroscopy (EDS) spectrum for ruthenium (Ru) of an ammonia synthesis catalyst composition according to one embodiment of the present disclosure before and after being used for 9 days at 450° C.
Figure 8B:
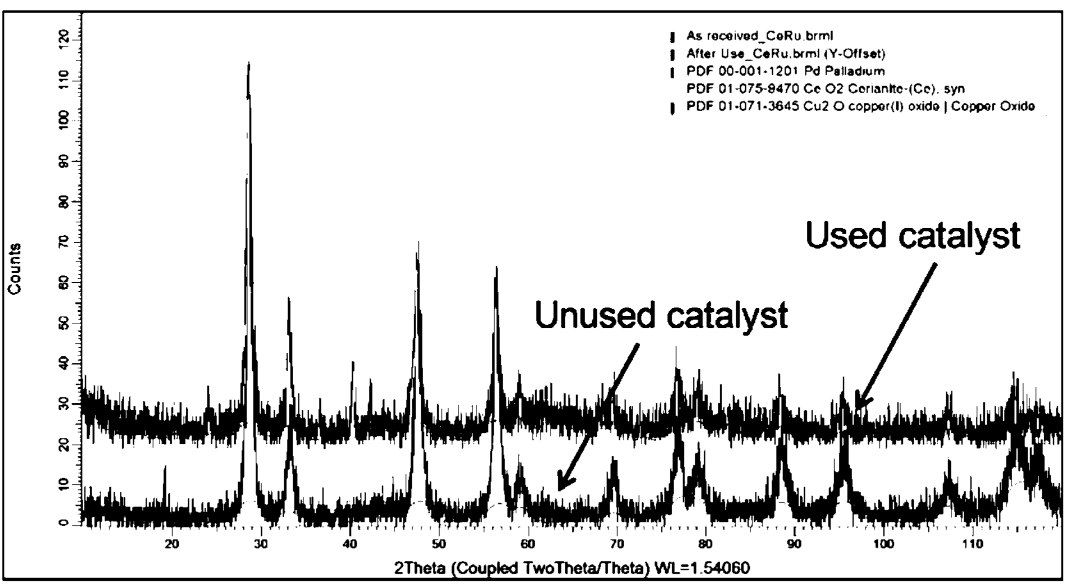
FIG. 8*b* shows an overlayed X-ray diffraction (XRD) spectra of the unused and used ammonia synthesis catalyst composition in FIG. 8*a*.

The ammonia catalyst compositions according to some embodiments of the present disclosure demonstrate excellent activity and/or stability when used in ammonia synthesis. Referring to FIG. 7, when deposited on a palladium membrane (i.e. a hydrogen species permeable membrane (HSPM)) an ammonia catalyst composition according to an embodiment of the present disclosure (M4; Ru metal species, ceria support, K, Cs and Ba promoter) demonstrated unexpectedly repeatable high synthesis rates (SR) above $3\times10^{-7}$ mol/cm$^2$/s. This high synthesis rate was achieved even when the catalyst composition and/or HSPM was recycled, further highlighting the efficiency of the catalyst compositions. As ammonia catalyst compositions according to one embodiment of the present disclosure also demonstrated no problematic particle sintering (see FIGS. 8*a* and 8*b*) when used in ammonia synthesis, thereby retaining the high surface area of the ruthenium metal species and as a result maintaining the number of catalytically active sites, which also highlights the stable nature of the catalyst compositions.

It will also be appreciated that various embodiments described herein may also apply as particular embodiments in relation to ammonia synthesis.

Chemical Reactors

A system for synthesising a product using a hydrogen permeable solid membrane selectively permeable to a hydrogen species for reaction with a second reactant may comprise a reactor of varying configurations. The reactor comprises at least a first and a second chamber section separated by a selectively hydrogen permeable solid membrane (HSPM) configured to provide a hydrogen species receiving side of the membrane in the first chamber section and a product synthesis side of the membrane in the second chamber section. The reactor also includes at least a hydrogen species source inlet for supply of a hydrogen species source to the first chamber section, and at least a second reactant inlet for supply of a second reactant source to the second chamber section. It will be appreciated that the reactor or system also includes at least a first outlet for obtaining at least a product of the reaction. The system also comprises a control means, such as a pressure control means, to drive migration of the hydrogen species through the membrane by imparting a concentration gradient or partial pressure differential of the hydrogen species.

The reactor may comprise a single membrane or a plurality of membranes, which for example may be stacked in the form of modules. The system may comprise a plurality of reactors. The reactors may operate in series or in parallel. The membranes may be a flat plate structure or a tubular structure. A number of membranes may be stacked together in a planar or tubular configuration. A number of single reactors may be combined to form a multi-tube module.

It will be appreciated that the system, reactor, or each chamber section, may include one or more inlets and outlets to provide supply of reactants, obtain products, or to recirculate various reactants and/or products.

It will also be appreciated that the reactor or system may be designed for recycling of the various reactants, reactant sources, intermediary products, or desired products provided to and produced in the chamber sections. The reactor or system may be provided in various designs and forms, for example in the form of a tubular reactor.

In the reactor, the second chamber section, second chamber inlet or product synthesis side of the membrane, may each be independently designed or configured together for directing the flow of the second reactant source across the surface of the membrane to facilitate the reaction. For example, channels may be provided at the surface of the membrane. The channels may be designed to facilitate forcing the nitrogen gas to sweep at close proximity to active sites on the membrane. It will be appreciated that the active sites are present at or near the surface of the hydrogen permeable phase, or when a catalyst is provided as a coating on the membrane then at or near the interface between the membrane and the catalyst. Such configurations and design provide further advantages for ammonia synthesis and can increase hydrogen conversion rates at less severe process conditions. The channels may be of various configurations and dimensions, such as parallel channels and serpentine channels.

The system and processes may also be integrated into more complex systems, such as systems and processes comprising a coal gasifier, electrolyser and/or natural gas reformer. The system and processes may also be used for hydrogen separation from other impurities, which may be provided in a reformate for storage as a product such as ammonia.

It will be understood to persons skilled in the art of the invention that many modifications may be made without departing from the scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

EXAMPLES

In order that the invention may be more clearly understood, particular embodiments of the invention are described in further detail below by reference to the following non-limiting experimental materials, methodologies and examples.

Example 1: Synthesis of Ru-Ceria with Triply Promoted Catalyst Compositions: Ceria ($CeO_2$) Support with Promoters K, Ba and Cs Stock solutions of the ruthenium metal species precursor, $Ru_3(CO)_{12}$, (0.008 M $Ru_3(CO)_{12}$) in THF (~230 mL THF+1.176 g of $Ru_3(CO)_{12}$) were prepared along with the reagents for the three promoter species $KNO_3$, $Ba(NO_3)_2$ and $CsNO_3$. 1 gram of the oxide support, $CeO_2$, was weighed into a round bottom flask and then the Ru solution added, and the mixture was stirred for 2 to 4 hours, the flask being sealed. Using a rotary evaporator, the THF solvent was then removed (200 mbar @ 25° C.). Once the solvent driven off, the solids are dried at temperature set between 250-370° C. for 4 to 6 hours, preferably under vacuum. Finally, the resulting black or grey coloured powder was cooled down to room temperature still under vacuum to provide a Ru-ceria solid material. In a separate flask, the promoter solutions of $KNO_3$, $Ba(NO_3)_2$ and $CsNO_3$ were mixed and diluted with deionised water to achieve the concentrations between 0.1 to 1.5 M. The mixed promoter solution was then added to the Ru/$CeO_2$ (black or grey powder) and stirred vigorously with a magnetic stirrer bar followed by sonication for 30 minutes. Sonicated mixture was then dried in the rotary evaporator bath to 40° C. and condenser water to 20° C. Drying further continued under slight vacuum, (70-200 mbar) over a 4 to 6 hour period.

Example 2: Synthesis of Ru-Magnesia Promoted Catalyst Compositions: Magnesia (MgO) Support with the Promoter Cs A Ru/Cs on MgO catalyst was manufactured using a modified method of Aika et al. 1992 (Journal catalysis 136, pg 126). The magnesia support was baked at 500° C. for 6 hours prior to use. The prepared support was then impregnated with $Ru_3(Co)_{12}$ in THF solution and the final loading was about 2%. The slurry was stirred during impregnation for 4 hours (appearing yellow) then the THF was removed in vacuum in the rotary evaporator until dry (and white). Subsequently the sample was dried at 350° C. for 2 hours under vacuum to break down and remove the carbonyl ligand. The Cs promoter was added to the Ru/MgO sample as a solution of $CsNO_3$. The target ratio of the Cs metal to the Ru metal was 1:1. The sample was left to stand for several hours (4 hrs) and then dried at 100° C. in a reactor then stored.

Example 3: Use of Ru Promoted Catalyst Compositions in a Membrane

For use in the membrane reactor typically catalyst inks were prepared with a terpinol base ink vehicle and mixed using a mortar and pestle or by ball milling. The solid to terpinol base ink vehicle ratio was kept at 50:50 wt %. The membrane was roughened by pressing catalyst powder on to the region of the membrane followed by cleaning of the membrane by ultrasonic treatment. The catalysis ink was then brush coated on the roughened surface and dried in a vacuum oven. Typical loadings were 0.07-0.12 g. While heating the furnace to the required temperature, hydrogen was supplied to the synthesis chamber for catalyst reduction and nitrogen to the hydrogen chamber as an inert gas to prevent oxidation of the fixed chamber. The sample temperature was achieved in 4 hours but catalysts reduction continued overnight at the process temperature for a period of more than 15 hours. Both gas chambers were operated at atmospheric pressures during reduction.

Once the catalyst reduction is over, the gases were swapped. The permeation of hydrogen via the hydrogen chamber, occurred as a result of partial pressure maintained with back pressure regulators, in both chambers. The ammonia synthesis rates were measured by purging the exit gases from the synthesis chamber of the reactor with known volume of 0.05M sulphuric acid and determining the ppm level of ammonia dissolved over time by using an ammonia probe (HACH).

Example 4: Catalyst Options and Membrane Performance

A library of ruthenium based catalysts was prepared both with use of a Chemspeed robotic tool and also by conventional synthetic means. The influence of several parameters (i.e. support type, size, catalytic promoter species) was investigated for hydrogen conversion rates. The hydrogen conversion was calculated as the ratio of converted hydrogen (3/2 times the amount of ammonia detected by GC) to the total hydrogen (the sum of converted hydrogen and unconverted hydrogen detected by GC). This ratio is divided by the catalyst mass to give the percent conversion per gram.

The interrelationships between a number of variables such as catalyst to support ratio, catalyst to catalytic promoter total ratio, and catalytic promoter composition were also evaluated. For example, when the amount of supported catalyst was increased, increased conversion rates were typically observed with higher pressures. In another example, when lower pressures were used for supported ruthenium metal species catalysts, a range of about 5% to 9% catalyst by weight typically achieved further enhanced conversion rates.

In some examples, when low pressure was used for supported ruthenium metal species catalysts with catalytic promotor species, catalytic promoter species levels from about 0.5 to 0.6 (molar ratio to catalyst) achieved further enhanced conversion rates. Pressures of about 5 bar to about 30 bar were also investigated.

Typical catalysts for use in the membranes are summarised in Table 1.

TABLE 1

Synthesised Ruthenium Promoted Catalyst Compositions

| ID/Support | Ru Catalyst (wt % of support) | Promoter (molar ratio to Ru catalyst) Total | K | Cs | Ba | Other |
|---|---|---|---|---|---|---|
| M4/$CeO_2$ | 10 | 1 | 0.33 | 0.33 | 0.33 | |
| M5/MgO | 10 | 0.1 | 0.5 | 0.5 | 0 | |
| M6/MgO | 10 | 0.3162 | 0 | 1 | 0 | |
| M7/$CeO_2$ | 10 | 0.3162 | 0 | 1 | 0 | |
| M8/OANP00140/14#10/$CeO_2$ | 9 | 0.7 | 0 | 0 | 0 | Y = 1 |
| M9/OAN-KNP00132/17#44$CeO_2$ | 5 | 0.4 | 0.5 | 0 | 0 | Rb = 0.5 |
| M10/OAN-KNP00127/17#39 $CeO_2$ | 5 | 0.4 | 0 | 0 | 0 | Rb = 1 |

The performance of the ruthenium metal species catalyst compositions M4, M5 and M6, in terms of conversion rates at 10 bar pressure was measured in the high throughput rig at low flow rates of ammonia synthesis gas (<1 ml/min). FIGS. 3-5 and 10 provide results and data for % $H_2$ conversion to $NH_3$ over 80 hours for the Ru catalyst compositions for M4, M5 and M6 catalyst formulations.

In another experiment, the ruthenium metal species catalyst compositions M4, M5 and M6 were also evaluated in the membrane reactor using a 100 μm thick Pd membrane at temperatures 400° C., 450° C., and 500° C., and 11 bar pressure, see FIG. 6. The ruthenium metal species catalyst produced peak synthesis rate (SR) at 450° C. The peak synthesis rate (SR) and conversion rate (SR) obtained with the ruthenium metal species catalyst M4 was respectively $2.34\times10^{-7}$ mol/cm$^2$/s and 3.85% at 450° C. This demonstrates excellent catalytic properties of these catalysts when used in ammonia synthesis, even after 17 hours in synthesis mode (SM).

Figure 9:
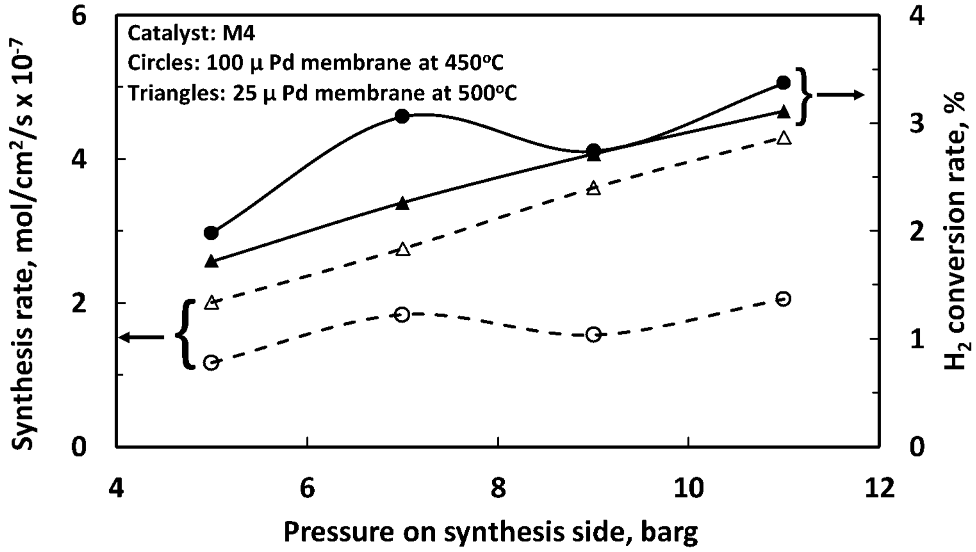
FIG. 9 shows the effect of pressure on synthesis rates and conversion rates of an ammonia synthesis catalyst composition (M4) according to one embodiment of the present disclosure at varying pressures using 100 μm and 25 μm thick Pd membranes.

In order to investigate the effect of the membrane thickness on the hydrogen permeation rates synthesis rates were determined using a 25 μm thick membrane and M4 as the catalyst. The permeation rates with this thickness of the membrane were found to be more than double compared to the 100 μm thick membrane. FIG. 9 compares the synthesis rate (SR) and conversion rate (CR) for 25 μm (at 500° C.) and 100 μm (at 450° C.) membranes with the supported ruthenium species catalyst composition M4. The SR is two times greater using the 25 μm membrane with similar CR. The peak SR and CR obtained with 25 μm membrane were respectively $4.33\times10^{-7}$ mol/cm$^2$/s and 3.13% at 500° C. There is a linear relationship between SR and pressure with 25 μm membrane, and for CR. The SR and CR measured with this setup at 500° C., 11 bar pressure under controlled synthesis conditions were 0.58 and 0.75 respectively.

The peak SR was observed at 450° C. for 100 μm membrane. To investigate this trend for 25 μm membrane, SR and CR were measured at different temperatures. It was found that SR and CR tend to plateau at higher temperatures in case of 25 μm membrane. The hydrogen permeation rates for 100 μm membrane and 25 μm membrane are respectively 40 and 80 ml/min. The larger volume of hydrogen available in case of 25 μm membrane, results in the equilibrium shifting more towards the ammonia formation compared to dissociation.

In another experiment, higher permeation rates were achieved by adjusting the pressure across the membrane and the flow rates of hydrogen to the hydrogen chamber. When the thickness of the membrane was changed from 100 μm to 25 μm the permeation rate increased from 40 ml/min to 80 ml/min, without any change in the hydrogen flow rate (~90 ml/min) to the hydrogen chamber. For example, it was found that the permeation rate had increased to 132 ml/min by increasing the inlet hydrogen flow to 150 ml/min at 500° C. and 11 bar pressure. In another example, the peak SR and CR achieved with hydrogen permeation rate of 120 ml/min were $6.95\times10^{-7}$ mol/cm$^2$/s and 3.1% respectively at 500° C. and 11 bar pressure.

Example 5: Stability of Catalysts

The stability of the performance of catalysts is an important property. The catalyst composition M4 was tested in a membrane reactor on a 25 μm Pd membrane at 500° C., 11 bar, $N_2$ flow 200 ml/min, $H_2$ pressure rate 130 ml/min. FIG. 7 demonstrates the stable nature of the catalyst compositions, which achieved synthesis rates (SR) greater than $3\times10^{-7}$ mol/cm$^2$/s over a period of 4 days using both new and recycled catalyst compositions and Pd membranes. The M4 catalyst composition of FIG. 7 had an unexpectedly higher SR when tested under the same conditions.

Figure 4:
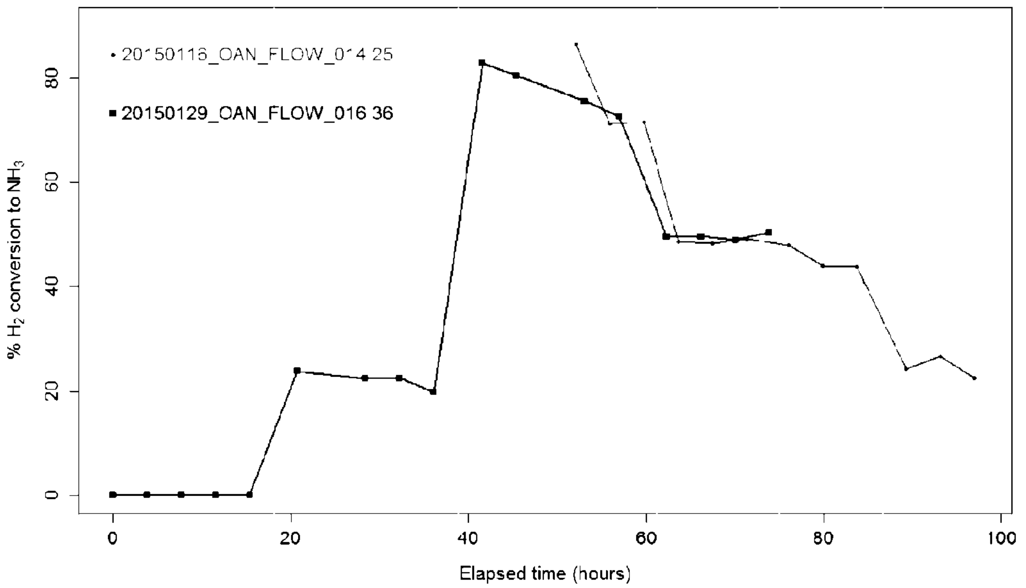
FIG. 4 demonstrates performance over time (three cycles) of triply promoted ammonia synthesis catalyst composition (M4) according to one embodiment of the present disclosure.
Figure 5:
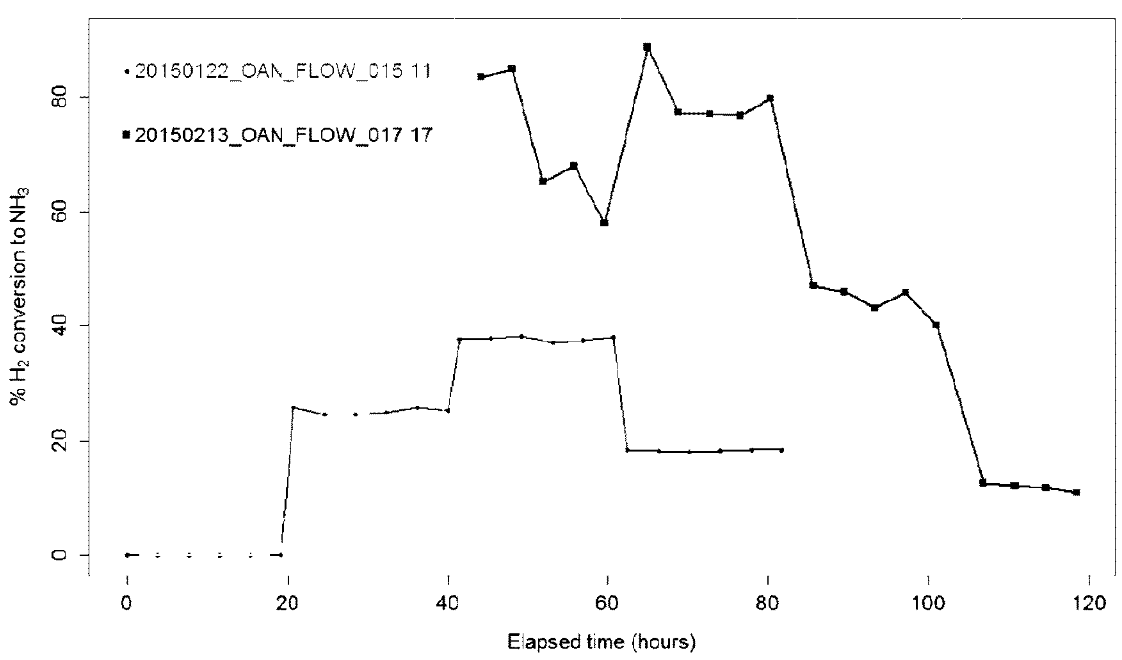
FIG. 5 demonstrates performance over time (three cycles) of a singly promoted ammonia synthesis catalyst composition according to one embodiment of the present disclosure.

The repeated performance over time of the catalyst compositions was also evaluated. The stability of long-term performance was investigated with analysis of a range of catalysts undertaken for greater than three days at varying temperatures. FIG. 4 provides the % $H_2$ conversion to $NH_3$ for the ammonia catalyst composition M4 over three cycles. FIG. 5 provides the % $H_2$ conversion to $NH_3$ for an ammonia catalyst composition M7. Both catalyst compositions were stable across 400° C. to 500° C. As can be seen, both catalyst compositions M4 and M7 maintain greater than 10% $H_2$ conversion to $NH_3$ after three cycles, with M4 providing better repeat measurements compared to M7. Nonetheless, it will be appreciated that both catalysts are stable.

Example 6: Influence of Support Particle Size

Figure 10A:
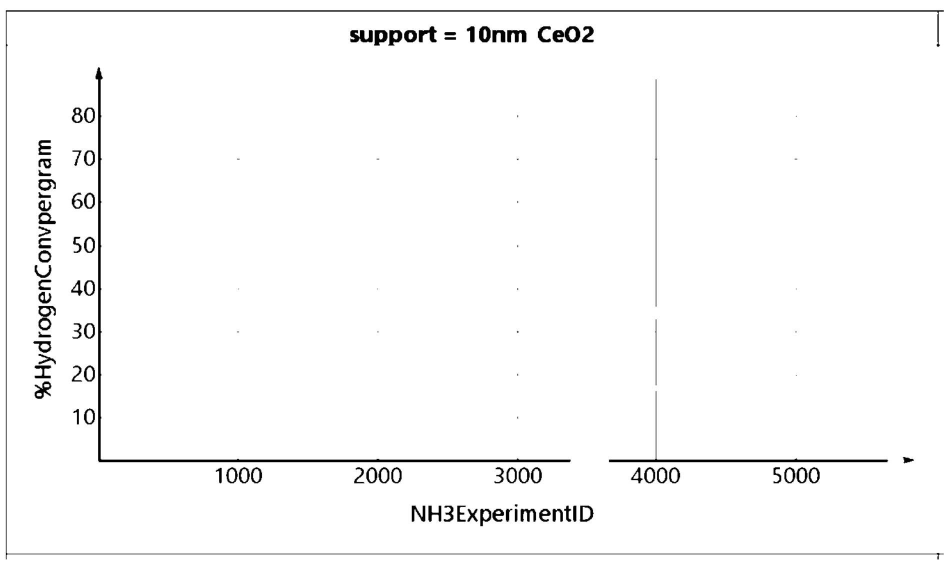
FIGS. 10*a*, 10*b* and 10*c* provides $H_2$ conversion rates for a range of different supports on Ru 10% with the combination of promoters B/Cs/K (0.3:0.3:0.3) according to some embodiments of the present disclosure.
Figure 10B:
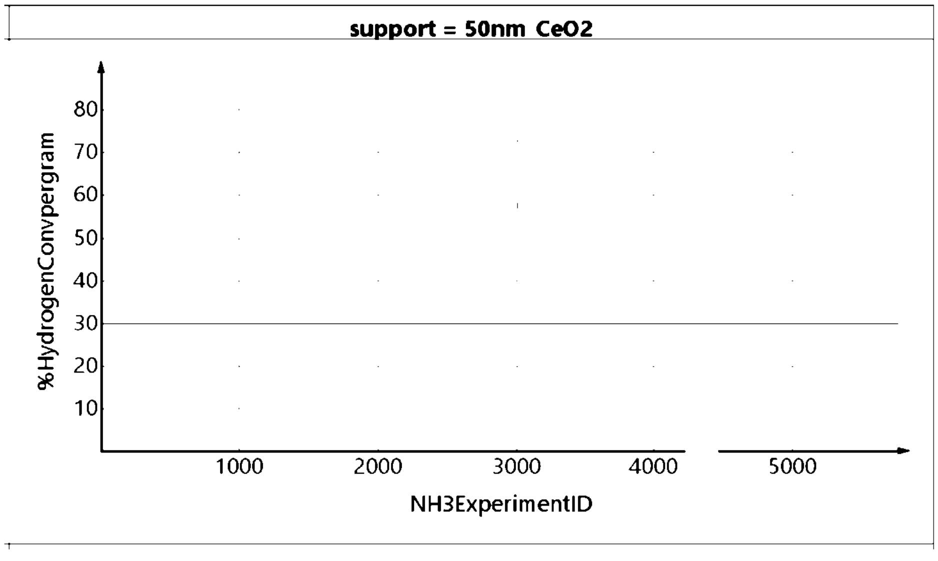
Figure 10C:
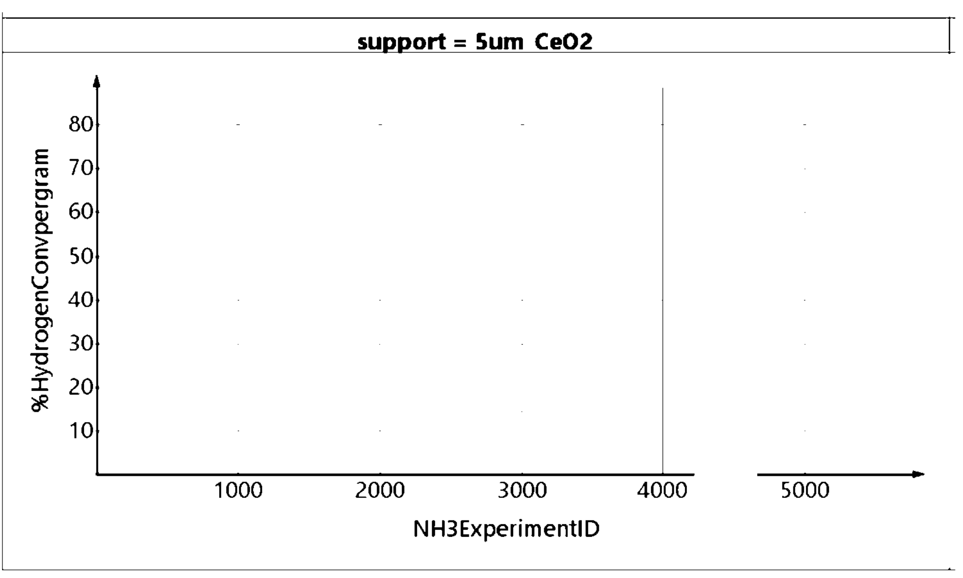

In another experiment the influence of particle size of the oxide support on the hydrogen conversion rate per gram of catalyst was investigated. FIGS. 10*a*, 10*b* and 10*c* plots the data with the inclusion of three promoters, B/Cs/K on a 10% Ru catalysts (0.3:0.3:0.3 ratios). Each dot is a single GC analysis point and so shows performance over time as well. This data also showed that the 5 μm ceria does not have the same performance, that is, there is an order of magnitude of performance between 50 nm and 5 μm.

Example 7: Comparison of Support Materials

In another experiment, the effect of different support surface areas of the support material on the performance of the catalysts were explored. It was found that the higher surface area materials and/or higher amounts of catalyst and promoter can provide further enhanced performance. In an additional experiment, a comparison of the effect of varied pressure on the performance of catalysts was investigated. It was found that on increasing pressure the performance of the support material showed an increase in overall catalyst performance.

Example 8: Hydrogen Transport Promoting Materials

Figure 11:
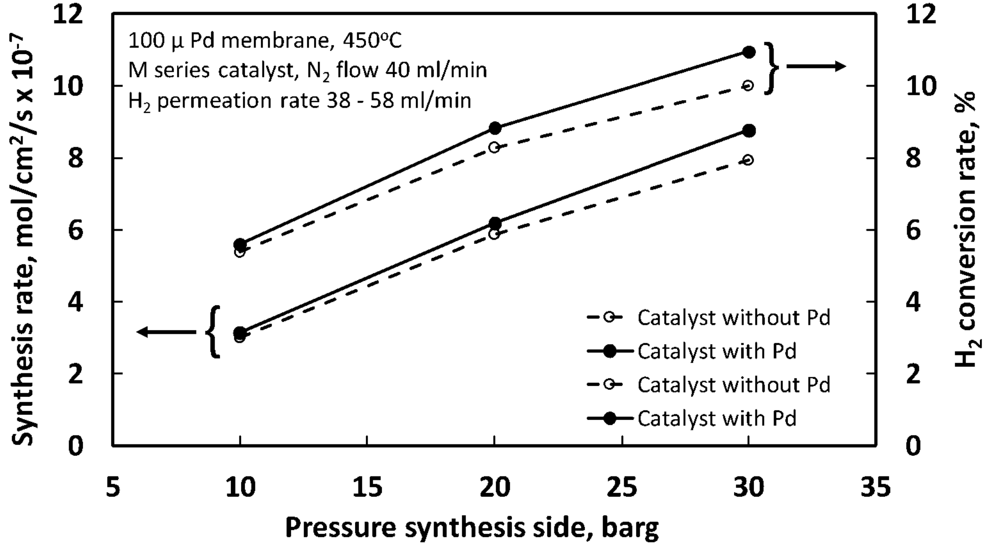
FIG. 11 demonstrates effect of Pd addition (as hydrogen transport material) to M4 catalyst (Ru-ceria promoter composition) according to one embodiment of the present disclosure on ammonia synthesis rate and hydrogen conversion rate as a function of pressure on the synthesis side.

Ammonia synthesis (SR) and conversion rates (CR) for the supported ruthenium metal species catalyst compositions were found to be surprisingly high, even without the addition of further additives. The addition of further additives, such as hydrogen transport promoter species (e.g. Pd/PdO), can further enhance the SR and CR of the ruthenium catalyst compositions (see FIG. 11).

Example 9: Membrane Reactor

For the below examples an HSPM membrane of palladium of specified thickness was assembled in a reactor chamber that allowed operation of the reactor at temperatures of up to 600° C. and pressure differentials across the membrane from about 10 bar to about 30 bar. The typical pressure differential across the membrane was about 10 bar.

In one experiment, the catalyst used was a ruthenium metal species catalyst composition. The ruthenium catalyst composition was prepared as an ink with an ink vehicle, for example terpinol based vehicle, by mixing the contents with mortar and pestle or by ball milling. The ruthenium metal species catalyst inks were prepared with 5 wt % PdO (transport promoter species). The solids to ink ratio was 50:50 wt %. The membrane was surface roughened by pressing a commercial heterogeneous iron oxide based ammonia synthesis catalyst, (sieved through 150 micron sieve) catalyst powder on to the circular region (20.5 mm diameter) of the membrane followed by cleaning of the membrane by ultrasonic treatment. The ruthenium metal species catalyst ink was then brush coated on the roughened surface, and dried in vacuum oven. For example, typical loadings of ruthenium metal species catalyst were in the range of about 0.07 g to about 0.12 g. In an example, ruthenium metal species catalyst reduction was achieved when the furnace was heated to the required temperature while hydrogen was supplied to the synthesis chamber, and nitrogen to the hydrogen chamber as an inert gas to prevent any oxidation of the fixture chamber. The sample temperature was achieved in 4 hours, however catalyst reduction continued overnight at the process temperature for a period greater than 15 hours. Both gas chambers were operated at atmospheric pressures during reduction. Once the ruthenium metal species catalyst reduction was over, the gases were swapped. For example, hydrogen was supplied to the hydrogen chamber and nitrogen to the synthesis chamber at required flow rates. The pressures in both the chambers were adjusted with the respective back pressure regulators. The same pressure was maintained in the two chambers, and the permeation of hydrogen occurs mainly due to the partial pressure difference in the two chambers. The ammonia synthesis rates were measured by purging the exit gas from the synthesis chamber of the reactor through a known volume (200 ml) of 0.05M solution of sulphuric acid and determining the ppm level of ammonia dissolved over a period of one hour by using ammonia probe (HACH ammonia probe), as mentioned previously. Ammonia synthesis rates were also measured in some experiments using the online ammonia gas analyser (Emerson). In an embodiment, the controlled synthesis rates in the reactor were measured by flowing the synthesis gas (composition: 75 v % $H_2$/25 v % $N_2$) into the synthesis chamber over the catalyst and nitrogen flowing into the hydrogen chamber at the process temperature and pressure. The synthesis gas flow rate is maintained at the corresponding value to the hydrogen permeation rates observed in the permeation mode experiments, taking into account the hydrogen permeating back to the other chamber. For example, if hydrogen permeation rate is 35 ml/min, the synthesis gas flow rate into the synthesis chamber is maintained at 93 ml/min (equivalent to 70 ml/min hydrogen).

The invention claimed is:

1. A catalyst composition comprising one or more catalyst hybrid particles and a transport promoter species,
- wherein each catalyst hybrid particle comprises a ruthenium metal species, an oxide support particle having an average particle size from about 5 nm to about 10 μm, and one or more catalytic promoter species each independently selected from the group consisting of La, Rb, Y, Yb, K, Cs, and Ba, or hydroxides, nitrates or oxides thereof, wherein the ruthenium metal species and one or more catalytic promoter species are supported on the oxide support particle,
- wherein the transport promoter species is in the form of a plurality of particles, and
- wherein the transport promoter species comprises a metal species selected from the group consisting of molybdenum, tungsten, iron, cobalt, boron, chromium, tantalum, osmium, palladium, platinum, nickel, and combinations thereof.

2. The catalyst composition of claim 1, wherein the catalytic promoter species are each independently selected from the group consisting of K, Cs, and Ba, or hydroxides, nitrates or oxides thereof.

3. The catalyst composition of claim 1, wherein the oxide support particle is selected from the group consisting of magnesia, ceria, silica, zirconia, titania, alumina, and any combinations thereof.

4. The catalyst composition of claim 1, wherein the oxide support particle is ceria.

5. The catalyst composition of claim 1, wherein each catalyst hybrid particle comprises a ceria support particle, one or more ruthenium metal particles, and a catalytic promoter species independently selected from the group consisting of K, Cs, and Ba, or hydroxides, nitrates or oxides thereof.

6. The catalyst composition of claim 1, wherein the catalytic promoter species are in contact with the ruthenium metal particles.

7. The catalyst composition of claim 1, wherein the ruthenium metal species is supported on the oxide support particle in an amount of between about 1 to 15 wt % compared to the weight of oxide support particle.

8. The catalyst composition of claim 1, wherein the molar ratio of the catalytic promoter species to the ruthenium metal species is between about 1:10 to about 1:1.

9. The catalyst composition of claim 1, wherein the ruthenium metal species are ruthenium metal nanoparticles having a particle size of from about 1 nm to about 30 nm.

10. The catalyst composition of claim 1, wherein the transport promoter species is a palladium metal species.

11. A nitrogen species selectively permeable solid membrane (NSPM) formed from a nitrogen permeable material or hydrogen species selectively permeable solid membrane (HSPM) formed from a hydrogen permeable material, wherein the NSPM or HSPM comprises a coating on at least one side thereof comprising a catalyst composition according to claim 1.

12. A process for synthesis of a product by reaction of at least a first reactant comprising a nitrogen or hydrogen species with a second reactant, the process comprising:
- (i) providing a nitrogen or hydrogen species selectively permeable solid membrane (NSPM or HSPM) according to claim 11, having a nitrogen or hydrogen species receiving side, respectively, and a product synthesis side;
- (ii) providing a nitrogen or hydrogen species source at the nitrogen or hydrogen species receiving side, respectively;
- (iii) providing a second reactant source at the product synthesis side;
- (iv) providing a concentration gradient or a partial pressure differential of the nitrogen or hydrogen species source across the NSPM or HSPM, respectively, such that the concentration of nitrogen or hydrogen is lower on the product synthesis side than on the nitrogen or hydrogen species receiving side to thereby effect migration of the nitrogen or hydrogen species through the NSPM or HSPM, respectively, for reaction as the first reactant with the second reactant at or near the surface of the product synthesis side.

* * * * *